(12) United States Patent
Uebel et al.

(10) Patent No.: US 11,099,319 B2
(45) Date of Patent: Aug. 24, 2021

(54) OPTICAL FIBER

(71) Applicant: ASML Netherlands B.V., Veldhoven (NL)

(72) Inventors: Patrick Sebastian Uebel, Marloffstein (DE); Sebastian Thomas Bauerschmidt, Wendelstein (DE); Peter Maximilian Götz, Altdorf (DE)

(73) Assignee: ASML Netherlands B.V., Veldhoven (NL)

(*) Notice: Subject to any disclaimer, the term of this patent is extended or adjusted under 35 U.S.C. 154(b) by 0 days.

(21) Appl. No.: 16/838,400

(22) Filed: Apr. 2, 2020

(65) Prior Publication Data

US 2020/0319400 A1    Oct. 8, 2020

(30) Foreign Application Priority Data

Apr. 3, 2019  (EP) .................................. 19167130
May 9, 2019  (EP) .................................. 19173416

(51) Int. Cl.
*G02B 6/02* (2006.01)
*G02B 6/44* (2006.01)

(52) U.S. Cl.
CPC ..... *G02B 6/02328* (2013.01); *G02B 6/02304* (2013.01); *G02B 6/4415* (2013.01); *G02B 6/4463* (2013.01)

(58) Field of Classification Search
CPC ............ G02B 6/02328; G02B 6/02304; G02B 6/4415; G02B 6/4463; G02B 6/02366;
(Continued)

(56) References Cited

U.S. PATENT DOCUMENTS 6,020,964 A    2/2000  Loopstra et al.
6,952,253 B2  10/2005  Lof et al.
(Continued)

FOREIGN PATENT DOCUMENTS

CN    106154402 A    11/2016
CN    108181684 A     6/2018
(Continued)

OTHER PUBLICATIONS

Brustlein et al., "Double-clad hollow core photonic crystal fiber for coherent Raman endoscope", *Optics Express*, vol. 19, No. 13, (2011); 12562-12568.
(Continued)

*Primary Examiner* — John Bedtelyon
(74) *Attorney, Agent, or Firm* — Sterne, Kessler, Goldstein & Fox P.L.L.C.

(57) ABSTRACT

An optical fiber, an apparatus for receiving input radiation and broadening a frequency range, a radiation source, a metrology arrangement and a lithographic apparatus are provided. The optical fiber comprises a hollow core, a cladding portion and a support portion. The cladding portion surrounds the hollow core and comprises a plurality of anti-resonance elements for guiding radiation through the hollow core. The support portion surrounds and supports the cladding portion and comprises an inner support portion, an outer support portion and a deformable connecting portion that connects the inner support portion to the outer support portion.

15 Claims, 10 Drawing Sheets

(58) Field of Classification Search
CPC . H01S 3/005; C03B 2203/42; C03B 2203/16; C03B 2203/14; C03B 37/0122
See application file for complete search history.

(56) References Cited

U.S. PATENT DOCUMENTS

| | | | |
|---|---|---|---|
| 6,961,116 | B2 | 11/2005 | Den Boef et al. |
| 7,265,364 | B2 | 9/2007 | Teunissen et al. |
| 7,646,471 | B2 | 1/2010 | Teunissen et al. |
| 7,701,577 | B2 | 4/2010 | Straaijer et al. |
| 7,791,724 | B2 | 9/2010 | Den Boef et al. |
| 8,115,926 | B2 | 2/2012 | Straaijer |
| 8,553,227 | B2 | 10/2013 | Jordattoska |
| 8,681,312 | B2 | 3/2014 | Straaijer |
| 8,692,994 | B2 | 4/2014 | Straaijer |
| 8,792,096 | B2 | 7/2014 | Straaijer |
| 8,797,554 | B2 | 8/2014 | Straaijer |
| 8,823,922 | B2 | 9/2014 | Den Boef |
| 9,915,779 | B2 | 3/2018 | Song et al. |
| 10,393,956 | B2 | 8/2019 | Russell et al. |
| 10,693,271 | B2 * | 6/2020 | Uebel ..................... G02F 1/365 |
| 2007/0058173 | A1 | 3/2007 | Holzapfel |
| 2009/0195768 | A1 | 8/2009 | Bijnen et al. |
| 2010/0233600 | A1 | 9/2010 | Den Boef et al. |
| 2010/0328655 | A1 | 12/2010 | Den Boef |
| 2011/0026032 | A1 | 2/2011 | Den Boef et al. |
| 2011/0102753 | A1 | 5/2011 | Van De Kerkhof et al. |
| 2011/0249244 | A1 | 10/2011 | Leewis et al. |
| 2012/0044470 | A1 | 2/2012 | Smilde et al. |
| 2013/0162996 | A1 | 6/2013 | Straaijer et al. |
| 2015/0033868 | A1 | 2/2015 | Cheng et al. |
| 2015/0261097 | A1 | 9/2015 | Mathijssen et al. |
| 2016/0161863 | A1 | 6/2016 | Den Boef et al. |
| 2016/0370717 | A1 | 12/2016 | Den Boef et al. |
| 2018/0356589 | A1 | 12/2018 | Mukasa et al. |
| 2020/0241281 | A1 * | 7/2020 | Benabid ............. A61B 1/00167 |

FOREIGN PATENT DOCUMENTS

| | | |
|---|---|---|
| EP | 1 628 164 A2 | 2/2006 |
| EP | 3 136 143 B1 | 4/2020 |
| FR | 3069336 A1 | 1/2019 |
| JP | 2013020207 A | 1/2013 |
| TW | 201712381 A | 4/2017 |
| WO | WO 2011/012624 A1 | 2/2011 |
| WO | WO 2016/102127 AI | 6/2016 |
| WO | WO 2018/127266 A1 | 7/2018 |

OTHER PUBLICATIONS

International Search Report and Written Opinion of the International Searching Authority directed to related International Patent Application No. PCT/EP2020/055906, dated May 28, 2020; 10 pages.

Lombardini et al., "High-resolution multimodal flexible coherent Raman endoscope", *Light: Science & Applications* (2018) 7:10; 8 pages.

Russell, P. St. J. et al., "Hollow-core photonic crystal fibres for gas-based nonlinear optics", *Nature Photonics*, vol. 8 (2014); pp. 278-286.

* cited by examiner

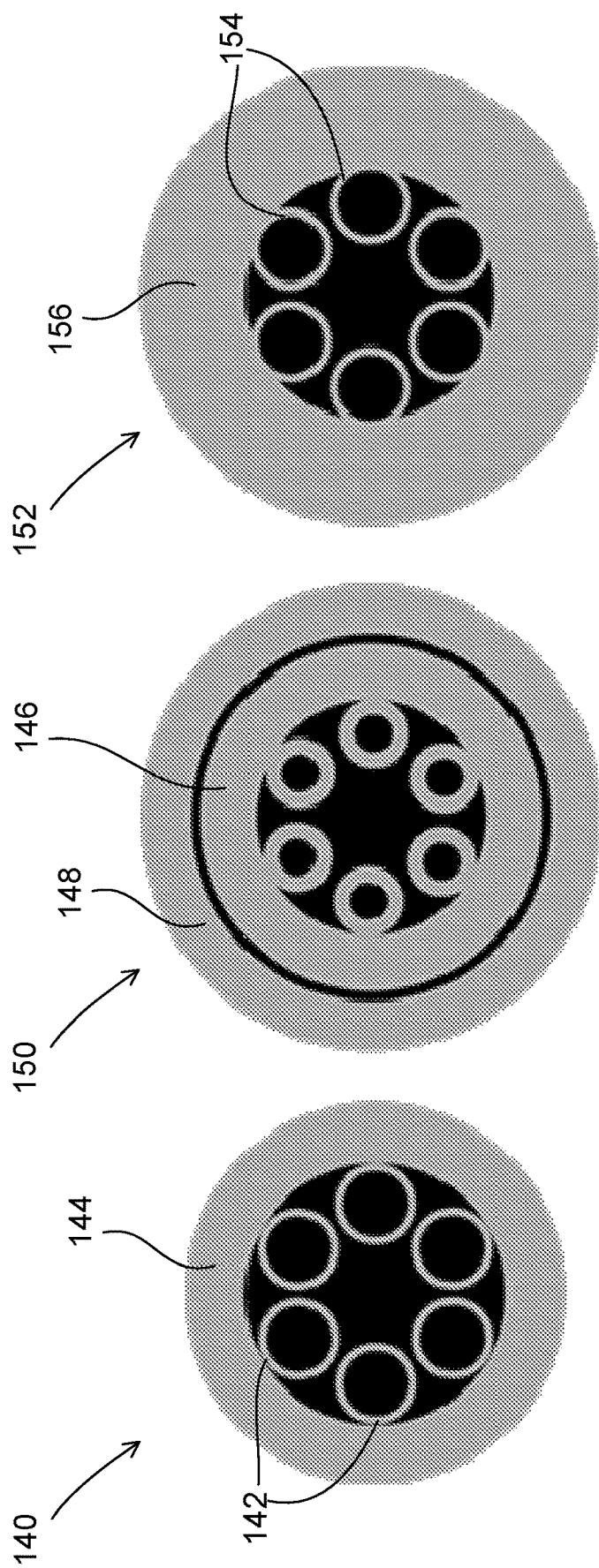

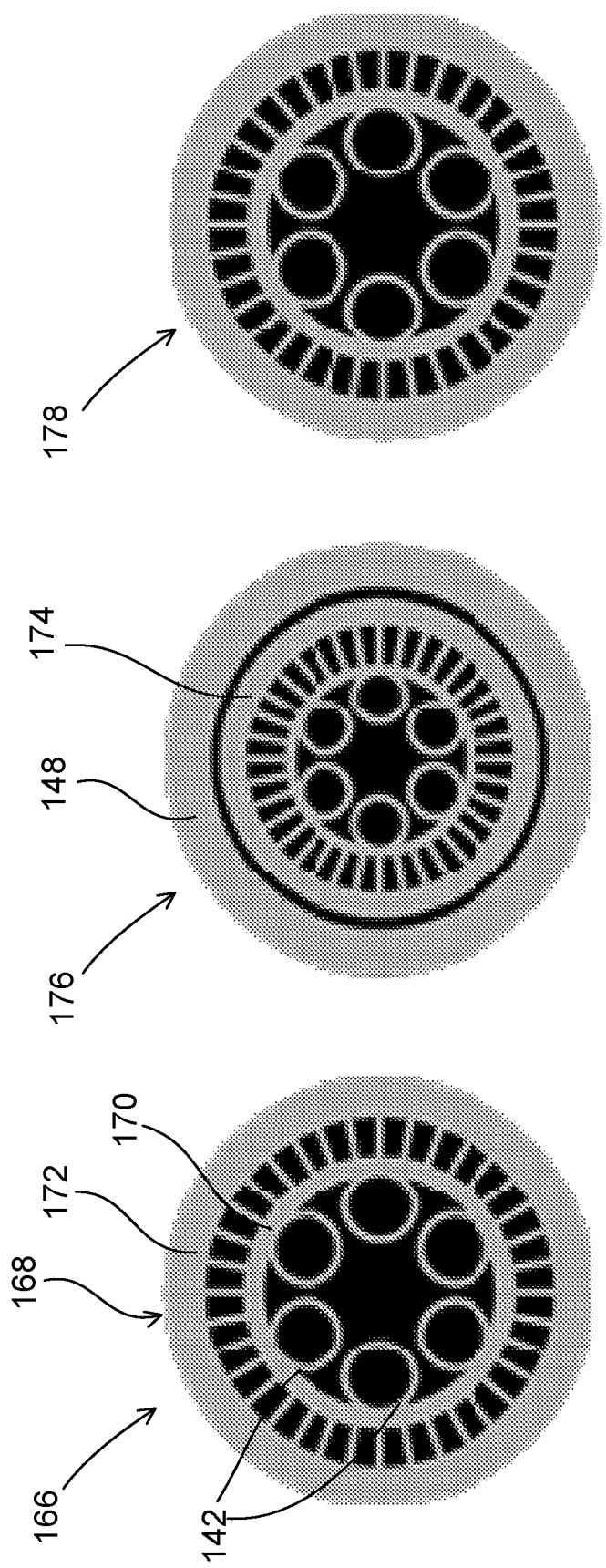

OPTICAL FIBER

FIELD

The present invention relates to an apparatus for receiving input radiation and broadening a frequency range of the input radiation so as to provide broadband output radiation.

BACKGROUND

A lithographic apparatus is a machine constructed to apply a desired pattern onto a substrate. A lithographic apparatus can be used, for example, in the manufacture of integrated circuits (ICs). A lithographic apparatus may, for example, project a pattern (also often referred to as "design layout" or "design") at a patterning device (e.g., a mask) onto a layer of radiation-sensitive material (resist) provided on a substrate (e.g., a wafer).

To project a pattern on a substrate a lithographic apparatus may use electromagnetic radiation. The wavelength of this radiation determines the minimum size of features which can be formed on the substrate. Typical wavelengths currently in use are 365 nm (i-line), 248 nm, 193 nm and 13.5 nm. A lithographic apparatus, which uses extreme ultraviolet (EUV) radiation, having a wavelength within the range 4-20 nm, for example 6.7 nm or 13.5 nm, may be used to form smaller features on a substrate than a lithographic apparatus which uses, for example, radiation with a wavelength of 193 nm.

Low-$k_1$ lithography may be used to process features with dimensions smaller than the classical resolution limit of a lithographic apparatus. In such process, the resolution formula may be expressed as $CD=k_1 \times \lambda/NA$, where $\lambda$ is the wavelength of radiation employed, NA is the numerical aperture of the projection optics in the lithographic apparatus, CD is the "critical dimension" (generally the smallest feature size printed, but in this case half-pitch) and $k_1$ is an empirical resolution factor. In general, the smaller $k_1$ the more difficult it becomes to reproduce the pattern on the substrate that resembles the shape and dimensions planned by a circuit designer in order to achieve particular electrical functionality and performance. To overcome these difficulties, sophisticated fine-tuning steps may be applied to the lithographic projection apparatus and/or design layout. These include, for example, but not limited to, optimization of NA, customized illumination schemes, use of phase shifting patterning devices, various optimization of the design layout such as optical proximity correction (OPC, sometimes also referred to as "optical and process correction") in the design layout, or other methods generally defined as "resolution enhancement techniques" (RET). Alternatively, tight control loops for controlling a stability of the lithographic apparatus may be used to improve reproduction of the pattern at low kl.

In the field of lithography, many measurement systems may be used, both within a lithographic apparatus and external to a lithographic apparatus. Generally, such a measurements system may use a radiation source to irradiate a target with radiation, and a detection system operable to measure at least one property of a portion of the incident radiation that scatters from the target. An example of a measurement system that is external to a lithographic apparatus is an inspection apparatus or a metrology apparatus, which may be used to determine properties of a pattern previously projected onto a substrate by the lithographic apparatus. Such an external inspection apparatus may, for example, comprise a scatterometer. Examples of measurement systems that may be provided within a lithographic apparatus include: a topography measurement system (also known as a level sensor); a position measurement system (for example an interferometric device) for determining position of a reticle or wafer stage; and an alignment sensor for determining a position of an alignment mark. These measurement devices may use electromagnetic radiation to perform the measurement.

Different types of radiation may be used to interrogate different types of properties of a pattern. Some measurements system may use a broadband radiation source. Such a broadband radiation source may be a supercontinuum source and may comprise an optical fiber having a non-linear medium through which a pulsed pump radiation beam is propagated to broaden a spectrum of the radiation.

It may be desirable to provide alternative apparatus (for example optical fibers) and methods for use in an apparatus for receiving input radiation and broadening a frequency range of the input radiation so as to provide (broadband) output radiation that at least partially addresses one or more problems associated with the prior art whether identified herein or otherwise.

SUMMARY

According to a first aspect of the invention there is provided an apparatus for receiving input radiation and broadening a frequency range of the input radiation so as to provide broadband output radiation. The apparatus comprises: an optical fiber and a gas. The optical fiber comprises: i) a hollow core; ii) a cladding portion surrounding the hollow core, the cladding portion comprising a plurality of anti-resonance elements for guiding radiation through the hollow core; and iii) a support portion surrounding and supporting the cladding portion. The support portion comprises an inner support portion, an outer support portion and a deformable connecting portion connecting the inner support portion to the outer support portion; The gas disposed within the hollow core for broadening a frequency range of a received input radiation so as to provide the broadband output radiation. Optionally, at least one of: a) the broadband output radiation comprises a continuous range of radiation frequencies, and b) the gas comprises a noble gas.

The deformable connecting portion may alternatively be referred to as a stress-absorbing portion. The deformable connecting portion is susceptible to being deformed. That is, the shape and/or dimensions of the deformable connecting portion may change in response to applied stress. In particular, the deformable connecting portion may be more susceptible to such deformation than other parts of the optical fiber such as, for example, the inner support portion.

It will be appreciated that, as used herein, the cladding portion is intended to mean a portion of the optical fiber for guiding radiation propagating through the hollow core of the optical fiber (i.e. confining said radiation within the hollow core). In particular, the cladding portion is arranged to confine radiation that propagates through the optical fiber predominantly inside the hollow core and to guide the radiation along the optical fiber.

It will be appreciated that an anti-resonance element is intended to mean an element which is arranged to confine radiation within the hollow core predominantly by anti-resonance. Such fibers comprising anti-resonant elements or structures are known in the art as anti-resonant fibers, tubular fibers, single-ring fibers, negative curvature fibers or inhibited coupling fibers. Various different designs of such fibers are known in the art. In particular, the term anti-resonance element is not intended to encompass elements that arranged to confine radiation within the hollow core predominantly by creating a photonic bandgap in the cladding portion (such as, for example, Kagome photonic crystal fibers). In general, such an anti-resonance element comprises a wall portion that at least partially defines the hollow core and separates the hollow core from an anti-resonance cavity. For example, the anti-resonance element may comprise a tube or capillary having a cavity that is separated from the hollow core by a wall portion. It will be appreciated that the wall portion may act as an anti-resonant Fabry-Perot resonator for radiation that propagates through the hollow core (and may be incident on the wall portion at a grazing incidence angle). The thickness of the wall portion may be suitable so as to ensure that reflection back into the hollow core is generally enhanced whereas transmission into the anti-resonance cavity is generally supressed.

The broadband output radiation may comprise a continuous range of radiation frequencies.

The broadband range may be a continuous range. The output radiation may comprise supercontinuum radiation. Continuous radiation may be beneficial for use in a number of applications, for example in metrology applications. The continuous range of frequencies may be used to interrogate a large number of properties. The continuous range of frequencies may for example be used to determine and/or eliminate a frequency dependency of a measured property.

The supercontinuum output radiation may comprise for example electromagnetic radiation over a wavelength range of 100 nm-4000 nm. The broadband output radiation frequency range may be for example 400 nm-900 nm, 500 nm-900 nm, or 200 nm-2000 nm. The supercontinuum output radiation may comprise white light.

The gas may comprise a noble gas.

The noble gas may comprise at least one of Argon, Krypton, Neon, Helium and Xenon. Alternatively or additionally to the noble gas, the gas may comprise a molecular gas (e.g. $N_2$, $O_2$, $CH_4$, $SF_6$).

The optical fiber is suitable for use in an apparatus for receiving input radiation and broadening a frequency range of the input radiation so as to provide output radiation. Optical fibers which guide radiation using anti-resonance elements can have a broader transmission window (i.e. having a larger transmission bandwidth) than photonic bandgap fibers. Advantageously, such fibers may therefore be better suited for use in an apparatus for receiving input radiation and broadening a frequency range of the input radiation so as to provide output radiation (for example a supercontinuum source).

Additionally or alternatively, the optical fiber may also be suitable for beam delivery applications (without broadening the frequency range of the radiation).

The optical fiber may also be suitable for use as a fiber that delivers light from a light source to a sensor.

The optical fiber may be a hollow-core, photonic crystal fiber (HC-PCF). Typically, such a hollow-core, photonic crystal fiber comprises a cladding portion (which may for example comprise anti-resonance elements) for guiding radiation within the fiber and a relatively thick jacket or support portion. The optical fiber is advantageous over such known hollow-core, photonic crystal fiber because the deformable connecting portion can act as a mechanical stress absorber to which any externally applied stress (for example applied to the outer support portion) can be dissipated without being transferred directly to the cladding portion. In other words, the deformable connecting portion isolates the inner support portion, the cladding portion and the hollow core from the outer support portion.

Without such a deformable connecting portion, any stress applied to the outer support portion can be transferred directly to the cladding portion. However, in general, the optical performance of the cladding portion (which comprises anti-resonance elements) is sensitive to local stresses within the anti-resonance elements because such stress can cause variations in the refractive index profile or induce birefringence. These effects can be detrimental to the optical performance and can result in modal scrambling or in an increase of confinement loss. These effects typically depend on wavelength and are the stronger the shorter the wavelength.

In use, hollow-core, photonic crystal fibers are often not supported along their entire length (for example on a surface). At least for some applications, hollow-core, photonic crystal fibers may be sufficiently long that such support is not practical. Therefore, typically photonic crystal fibers are often supported using a plurality of discrete, spaced-apart local mounts or clamps. For example, the fiber may be clamped at each end of the fiber (and one or more intermediate clamps may be provided therebetween). Mounting the fiber in this way will introduce specific local external stress to the fiber. Similarly, any bending of the fiber (which may be desired in a particular application) will also introduce specific local external stress to the fiber.

Advantageously, in contrast to known arrangements, the optical fiber at least partially addresses these problems since any externally applied stress or tension is reduced by the deformable connecting portion before reaching the cladding portion. As a result, the detrimental effects on the optical performance associated with externally applied stress can be mitigated.

The inner support portion, the outer support portion and the deformable connecting portion may be formed from the same material.

For example, the deformable connecting portion may comprise a plurality of generally radially extending portions of the material interspersed with voids, the generally radially extending portions of the material connecting the inner support portion to the outer support portion.

It is particularly advantageous for the inner support portion, the outer support portion and the deformable connecting portion to be formed from the same material, as now discussed.

In typical beam-delivery applications, it is known to provide optical fibers with a protective polymer coating which surrounds the glass material from which the fiber is formed. Such a protective coating can distribute the stress and can mitigate the detrimental effects that external stress can cause.

It will be appreciated that in some applications, in use, the optical fiber may form part of an apparatus for receiving input radiation and broadening a frequency range of the input radiation so as to provide output radiation. For example, it may be arranged to receive high intensity, ultra-fast laser pulses and the hollow core may be filled with a suitable working gas that such ultra-fast laser pulses can interact with so as to produce a supercontinuum. To achieve this, the optical fiber may be disposed in gas chamber which is filled with the working gas. In such applications it is desirable to avoid any polymer coatings since these coating can undergo outgassing within the closed environment of the gas chamber. These outgassed vapours can find their way into the hollow-core of the optical fiber where they can interact with the laser radiation and can lead to contaminants being deposited therein. In turn, these can reduce the optical performance of the supercontinuum source.

It is therefore advantageous for form the outer support portion and the deformable connecting portion (which together may be considered to form an outer protective stress-mitigating mechanism) from the same material (for example glass) as the inner support portion, such that outgassing is avoided.

The material (from which the inner support portion, the outer support portion and/or the deformable connecting portion are formed) may comprise glass.

That is, the material may comprise an amorphous (i.e. non-crystalline) material that exhibits a glass transition when heated to a transition temperature. For example, the material may comprise a silica glass. Advantageously, glass does not outgas.

The deformable connecting portion may comprise a ring structure arranged around the inner support portion; the ring structure may comprise a plurality of apertures interspersed with a plurality of generally radially extending portions of material extending generally between the inner support portion and the outer support portion.

That is, the support portion may be considered to be provided with a plurality of generally axially extending apertures (which apertures may define the deformable connecting portion).

The deformable connecting portion may comprise a plurality of ring structures arranged around the inner support portion; each ring structure may comprise a plurality of apertures interspersed with a plurality of generally radially extending portions of material extending generally between the inner support portion and the outer support portion.

In cross-section the apertures (of the or each ring structure) may be generally rectangular.

Generally rectangular is intended to encompass both true rectangles and trapezoids.

In cross-section the apertures (of the or each ring structure) may be generally of the form of a sector of an annulus.

The thickness of the inner support portion may be sufficiently large that the apertures in the deformable connecting portion do not act as anti-resonance elements.

For example the thickness of the inner support portion may be at least 1 μm to 500 μm.

The plurality of anti-resonance elements of the cladding portion may be disposed in a ring structure around the hollow core.

An inner surface of the ring structure of anti-resonance elements may at least partially define the hollow core of the fiber. The diameter of the hollow core (which may be defined as the smallest dimension between opposed anti-resonance elements) may be between 10 and 100 μm. The diameter of the hollow core may affect the mode field parameter, impact loss, dispersion, modal plurality, and non-linearity properties of the hollow core fiber.

In some embodiments, the cladding portion may comprise a single ring arrangement of anti-resonance elements. This may mean that a line in any radial direction from a center of the hollow core to an exterior of the optical fiber passes through no more than one anti-resonance element.

Each of the plurality of anti-resonance elements may comprise a capillary.

A capillary may also be referred to as a tube. The capillaries may be circular in shape, or may have another shape. The capillaries may comprise a wall surrounding a hollow capillary core. The capillary wall may have a wall thickness between 0.01-10.0 μm.

The plurality of anti-resonance elements may be arranged so that each of the anti-resonance elements is not in contact with any of the other anti-resonance elements.

Each of the anti-resonance elements may be in contact with the inner support portion and spaced apart from adjacent anti-resonance elements in the ring structure. Such an arrangement may be beneficial since it may increase a transmission bandwidth of the optical fiber.

According to another aspect of the invention there is provided a radiation source for providing broadband output radiation, the radiation source comprising: the apparatus according to the first aspect of the invention; and an input radiation source configured to provide input radiation to the apparatus; wherein the apparatus is configured to broaden the input radiation to provide the broadband output radiation.

The input radiation may be pulsed. The input radiation source may comprise a laser source. The input radiation source may comprise an ultrafast laser source.

The broadband output radiation may have an average power of at least 1 W.

The broadband output radiation may have an average power of at least 5 W. For example, the broadband output radiation may have an average power of at least 10 W.

The broadband output radiation may have a power spectral density in the entire wavelength band of the output radiation of at least 0.1 mW/nm. The power spectral density in the entire wavelength band of the output radiation may be at least 1 mW/nm. The power spectral density in the entire wavelength band of the output radiation may be at least 3 mW/nm.

According to a further aspect of the invention there is provided a metrology arrangement for determining a parameter of interest of a structure on a substrate, the metrology arrangement comprising: the radiation source according to the another aspect of the invention; an illumination sub-system for illuminating the structure on the substrate using the broadband output radiation; and a detection sub-system for detecting a portion of radiation scattered and/or reflected by the structure, and for determining the parameter of interest from said portion of radiation.

According to yet another aspect of the invention there is provided a metrology apparatus comprising the metrology arrangement.

According to yet a further aspect of the invention there is provided an inspection apparatus comprising the metrology arrangement.

According to an aspect of the invention there is provided a lithographic apparatus comprising the metrology arrangement.

According to an aspect of the invention there is provided an optical fiber comprising: a hollow core; a cladding portion surrounding the hollow core, wherein the cladding portion comprises an inner support without microstructures, an outer portion and a deformable connecting portion connecting the inner portion to the outer portion.

It will be appreciated that a cladding portion that comprises an inner support without microstructures is not intended to encompass hollow core photonic crystal fibers (either anti-resonance fibers or photonic band gap fibers). The optical fiber may be of a type referred to as a capillary waveguide but which is provided with a deformable connecting portion. Such capillary waveguides (typically with larger cores than photonic crystal fibers) are used, for example, in high-energy physics. Capillary waveguides may, for example, have cores of the order of some 100 μm to some mm.

These capillary waveguides are very sensitive to stress. The optical fiber is advantageous for reasons analogous to those explained above with reference to the optical fiber that are used in the apparatus of the first aspect of the invention. In particular, the deformable connecting portion can act as a mechanical stress absorber to which any externally applied stress (for example applied to the outer portion) can be dissipated without being transferred directly to the inner support. In other words, the deformable connecting portion isolates the inner support from the outer portion.

The optical fiber may have any features of the optical fiber that is used in the apparatus of the first aspect of the invention as appropriate (excluding any features of the plurality of anti-resonance elements, which constitute a microstructure).

The hollow core may have a diameter larger than 20 µm. Optionally, the hollow core may have a diameter larger than 50 µm. Optionally, the hollow core may have a diameter larger than 100 µm.

According to an aspect of the invention there is provided a method of forming an optical fiber, the method comprising: providing a manufacturing intermediate having an elongate body comprising: a hollow core; a cladding portion surrounding the hollow core; and a support portion surrounding the cladding portion, wherein the support portion comprises an inner support portion, an outer support portion and a connecting portion connecting the inner support portion to the outer support portion, the connecting portion comprising a ring structure arranged around the inner support portion, the ring structure comprising a plurality of apertures arranged generally between the inner support portion and the outer support portion; and heating and drawing the manufacturing intermediate so as to form the optical fiber.

The method according to the tenth aspect allows a hollow core optical fiber to be formed. The optical fiber may be a hollow-core, photonic crystal fiber (HC-PCF). The optical fiber may have any of the features of the optical fiber used in the apparatus of the first aspect of the invention.

The method is advantageous since the manufacturing intermediate is provided with a connecting portion comprising a ring structure arranged around the inner support portion before the manufacturing intermediate is heated and drawn so as to form the optical fiber. This connecting portion can act as a thermally insulating layer during the heating and drawing process. Advantageously, this can protect the cladding portion during the fiber drawing process.

The cladding portion surrounding the hollow core may comprise a plurality of tubes disposed in a ring structure around the hollow core. Following the heating and drawing of the manufacturing intermediate so as to form the optical fiber, these tubes (which may alternatively be referred to as capillaries) may each form an anti-resonance element for guiding radiation through the hollow core. It may be desirable for the plurality of tubes or capillaries to be arranged so that following the heating and drawing of the manufacturing intermediate so as to form the optical fiber each of the tubes is not in contact with any of the other tubes.

The optical fiber may be suitable for use in an apparatus for receiving input radiation and broadening a frequency range of the input radiation so as to provide output radiation. In some embodiments, it may be desirable for (following the heating and drawing of the manufacturing intermediate so as to form the optical fiber) the tubes or capillaries of the cladding portion of the optical fiber to have a wall thickness of 200 nm of less. This may enable resonance-free operation for wavelengths down to 400 nm. The inventors have found that when drawing fibers with capillary walls which are this thin, properties of the capillaries of the optical fiber have a strongly increased sensitivity to variations in the process parameters of the heating and drawing process. This can result, for example, in an uncontrolled expansion of the capillaries and can lead to a final optical fiber wherein adjacent tubes of capillaries are in contact.

In addition to forming optical fibers with relatively thin capillary walls (for example, having a wall thickness of 200 nm of less) in the cladding portion, it is also desirable to form optical fibers with a relatively thick outer diameter so as to reduce sensitivity of the optical performance of the optical fiber to external stresses (for example, applied by mechanical or thermal effects). However, the inventors have found that the fabrication yield of optical fibers with such relatively thin walls reduces dramatically as the outer diameter of the fiber increases. It is thought that during the drawing process, the support portion acts as to conduct heat to the cladding portion and, as a result, the capillaries of the cladding portion start tapering at an earlier position than the support portion.

The connecting portion of the manufacturing intermediate provided as part of the method can act as a (partially) thermally insulating layer during the heating and drawing process. The heat transfer to the cladding portion is delayed and/or the amount of transferred heat to the cladding portion is reduced. Advantageously, this can protect the cladding portion during the fiber drawing process.

A manufacturing intermediate is an intermediate form obtained during the process of producing the optical fiber. The manufacturing intermediate may be formed from a preform of a fiber, and may be drawn into a fiber. The manufacturing intermediate may be referred to as a cane.

Providing the manufacturing intermediate may comprise: providing a preform; and heating and drawing the preform so as to form at least part of the manufacturing intermediate.

Providing the manufacturing intermediate may further comprise providing the at least part of the manufacturing intermediate within an outer jacket.

The connecting portion comprising a ring structure arranged around the inner support portion may be formed in the outer jacket.

In such embodiments, the at least part of the manufacturing intermediate (which may be referred to as a cane) is sleeved within a structured outer jacket that comprises one or more ring structures of hollow channels. These hollow channels will not only serve as an insulating layer during fabrication but will also lower the sensitivity of the formed optical fiber to external stresses.

Alternatively, the connecting portion comprising a ring structure arranged around the inner support portion may be formed in the preform.

In such embodiments, one or more ring structures of hollow channels are formed in the preform during preform manufacturing. This has the advantage that the thickness of (for example glass) material between cladding portion and the connecting portion in the optical fiber can be made very small.

BRIEF DESCRIPTION OF THE DRAWINGS

Embodiments of the invention will now be described, by way of example only, with reference to the accompanying schematic drawings, in which:

FIG. 8 is a schematic cross sectional view of the new optical fiber shown in

FIG. 7 in a plane containing the axis of the optical fiber;

FIGS. 12(A)-12(C) are a schematic cross sectional view of: 12(A) a preform; 12(B) a manufacturing intermediate (comprising a cane and cane jacket); and 12(C) an optical fiber formed during a method for forming hollow core optical fibers in fiber drawing facilitates using a technique that may be referred to as a stack-and-draw method;

FIGS. 14(A)-14(C) are a schematic cross sectional view of: 14(A) a preform; 14(B) a manufacturing intermediate (comprising a cane and cane jacket); and 14(C) an optical fiber formed during a first new method for forming hollow core optical fibers in fiber drawing facilitates using a technique that may be referred to as a stack-and-draw method.

DETAILED DESCRIPTION

In the present document, the terms "radiation" and "beam" are used to encompass all types of electromagnetic radiation, including ultraviolet radiation (e.g. with a wavelength of 365, 248, 193, 157 or 126 nm) and EUV (extreme ultra-violet radiation, e.g. having a wavelength in the range of about 5-100 nm).

The term "reticle", "mask" or "patterning device" as employed in this text may be broadly interpreted as referring to a generic patterning device that can be used to endow an incoming radiation beam with a patterned cross-section, corresponding to a pattern that is to be created in a target portion of the substrate. The term "light valve" can also be used in this context. Besides the classic mask (transmissive or reflective, binary, phase-shifting, hybrid, etc.), examples of other such patterning devices include a programmable mirror array and a programmable LCD array.

Figure 1:
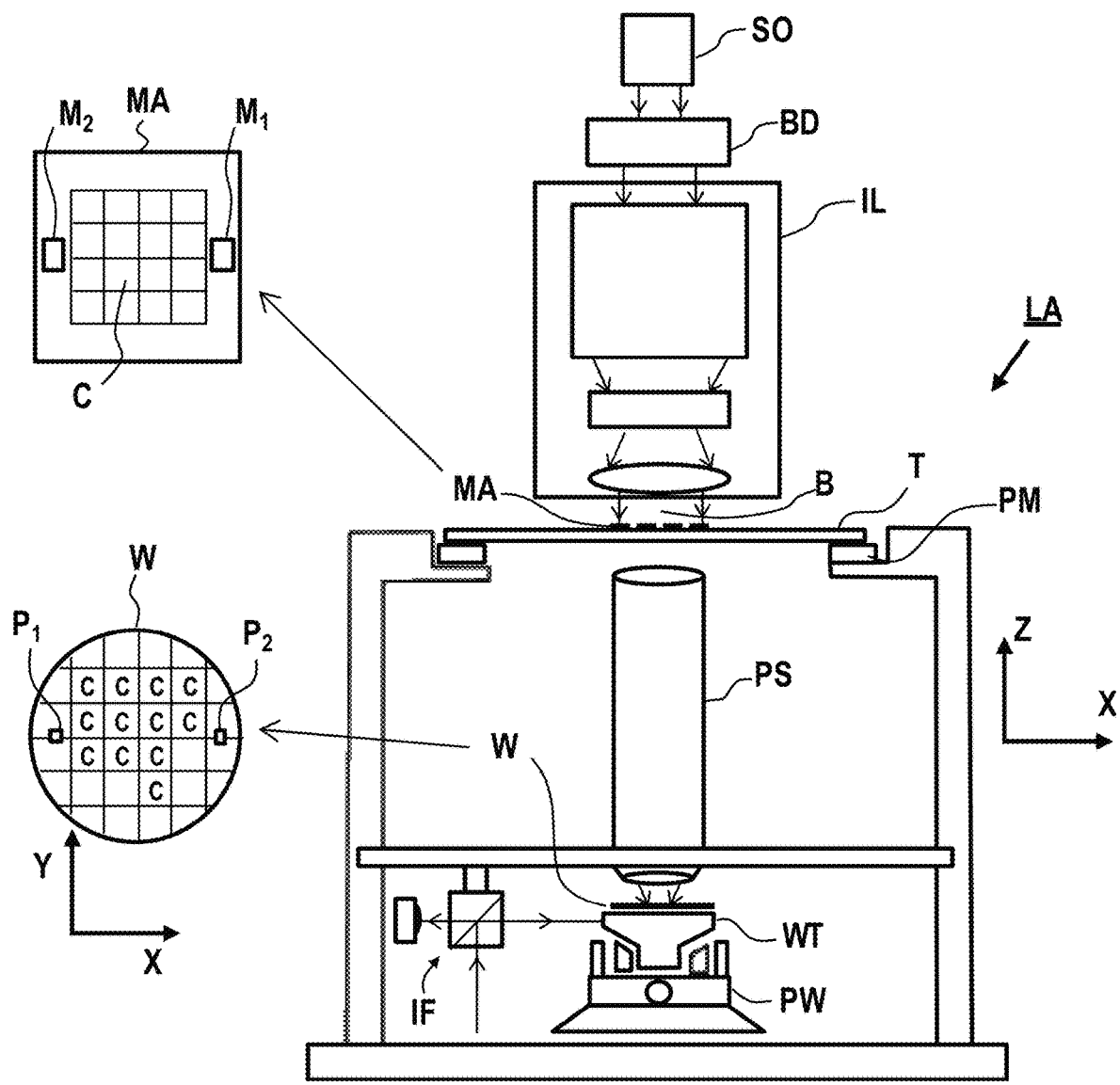
FIG. 1 depicts a schematic overview of a lithographic apparatus.

FIG. 1 schematically depicts a lithographic apparatus LA. The lithographic apparatus LA includes an illumination system (also referred to as illuminator) IL configured to condition a radiation beam B (e.g., UV radiation, DUV radiation or EUV radiation), a mask support (e.g., a mask table) T constructed to support a patterning device (e.g., a mask) MA and connected to a first positioner PM configured to accurately position the patterning device MA in accordance with certain parameters, a substrate support (e.g., a wafer table) WT constructed to hold a substrate (e.g., a resist coated wafer) W and connected to a second positioner PW configured to accurately position the substrate support in accordance with certain parameters, and a projection system (e.g., a refractive projection lens system) PS configured to project a pattern imparted to the radiation beam B by patterning device MA onto a target portion C (e.g., comprising one or more dies) of the substrate W.

In operation, the illumination system IL receives a radiation beam from a radiation source SO, e.g. via a beam delivery system BD. The illumination system IL may include various types of optical components, such as refractive, reflective, magnetic, electromagnetic, electrostatic, and/or other types of optical components, or any combination thereof, for directing, shaping, and/or controlling radiation. The illuminator IL may be used to condition the radiation beam B to have a desired spatial and angular intensity distribution in its cross section at a plane of the patterning device MA.

The term "projection system" PS used herein should be broadly interpreted as encompassing various types of projection system, including refractive, reflective, catadioptric, anamorphic, magnetic, electromagnetic and/or electrostatic optical systems, or any combination thereof, as appropriate for the exposure radiation being used, and/or for other factors such as the use of an immersion liquid or the use of a vacuum. Any use of the term "projection lens" herein may be considered as synonymous with the more general term "projection system" PS.

The lithographic apparatus LA may be of a type wherein at least a portion of the substrate may be covered by a liquid having a relatively high refractive index, e.g., water, so as to fill a space between the projection system PS and the substrate W—which is also referred to as immersion lithography. More information on immersion techniques is given in U.S. Pat. No. 6,952,253, which is incorporated herein by reference.

The lithographic apparatus LA may also be of a type having two or more substrate supports WT (also named "dual stage"). In such "multiple stage" machine, the substrate supports WT may be used in parallel, and/or steps in preparation of a subsequent exposure of the substrate W may be carried out on the substrate W located on one of the substrate support WT while another substrate W on the other substrate support WT is being used for exposing a pattern on the other substrate W.

In addition to the substrate support WT, the lithographic apparatus LA may comprise a measurement stage. The measurement stage is arranged to hold a sensor and/or a cleaning device. The sensor may be arranged to measure a property of the projection system PS or a property of the radiation beam B. The measurement stage may hold multiple sensors. The cleaning device may be arranged to clean part of the lithographic apparatus, for example a part of the projection system PS or a part of a system that provides the immersion liquid. The measurement stage may move beneath the projection system PS when the substrate support WT is away from the projection system PS.

In operation, the radiation beam B is incident on the patterning device, e.g. mask, MA which is held on the mask support T, and is patterned by the pattern (design layout) present on patterning device MA. Having traversed the mask MA, the radiation beam B passes through the projection system PS, which focuses the beam onto a target portion C of the substrate W. With the aid of the second positioner PW and a position measurement system IF, the substrate support WT can be moved accurately, e.g., so as to position different target portions C in the path of the radiation beam B at a focused and aligned position. Similarly, the first positioner PM and possibly another position sensor (which is not explicitly depicted in FIG. 1) may be used to accurately position the patterning device MA with respect to the path of the radiation beam B. Patterning device MA and substrate W may be aligned using mask alignment marks M1, M2 and substrate alignment marks P1, P2. Although the substrate alignment marks P1, P2 as illustrated occupy dedicated target portions, they may be located in spaces between target portions. Substrate alignment marks P1, P2 are known as scribe-lane alignment marks when these are located between the target portions C.

Figure 2:
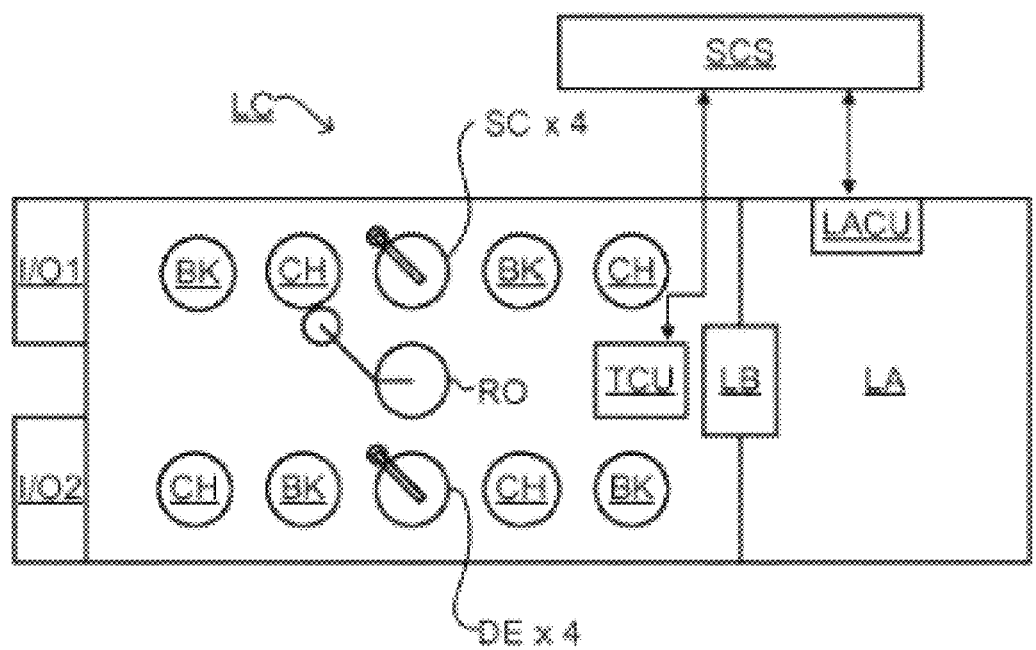
FIG. 2 depicts a schematic overview of a lithographic cell.

As shown in FIG. 2 the lithographic apparatus LA may form part of a lithographic cell LC, also sometimes referred to as a lithocell or (litho)cluster, which often also includes apparatus to perform pre- and post-exposure processes on a substrate W. Conventionally these include spin coaters SC to deposit resist layers, developers DE to develop exposed resist, chill plates CH and bake plates BK, e.g. for conditioning the temperature of substrates W e.g. for conditioning solvents in the resist layers. A substrate handler, or robot, RO picks up substrates W from input/output ports I/O1, I/O2, moves them between the different process apparatus and delivers the substrates W to the loading bay LB of the lithographic apparatus LA. The devices in the lithocell, which are often also collectively referred to as the track, are typically under the control of a track control unit TCU that in itself may be controlled by a supervisory control system SCS, which may also control the lithographic apparatus LA, e.g. via lithography control unit LACU.

In order for the substrates W exposed by the lithographic apparatus LA to be exposed correctly and consistently, it is desirable to inspect substrates to measure properties of patterned structures, such as overlay errors between subsequent layers, line thicknesses, critical dimensions (CD), etc. For this purpose, inspection tools (not shown) may be included in the lithocell LC. If errors are detected, adjustments, for example, may be made to exposures of subsequent substrates or to other processing steps that are to be performed on the substrates W, especially if the inspection is done before other substrates W of the same batch or lot are still to be exposed or processed.

An inspection apparatus, which may also be referred to as a metrology apparatus, is used to determine properties of the substrates W, and in particular, how properties of different substrates W vary or how properties associated with different layers of the same substrate W vary from layer to layer. The inspection apparatus may alternatively be constructed to identify defects on the substrate W and may, for example, be part of the lithocell LC, or may be integrated into the lithographic apparatus LA, or may even be a stand-alone device. The inspection apparatus may measure the properties on a latent image (image in a resist layer after the exposure), or on a semi-latent image (image in a resist layer after a post-exposure bake step PEB), or on a developed resist image (in which the exposed or unexposed parts of the resist have been removed), or even on an etched image (after a pattern transfer step such as etching).

Figure 3:
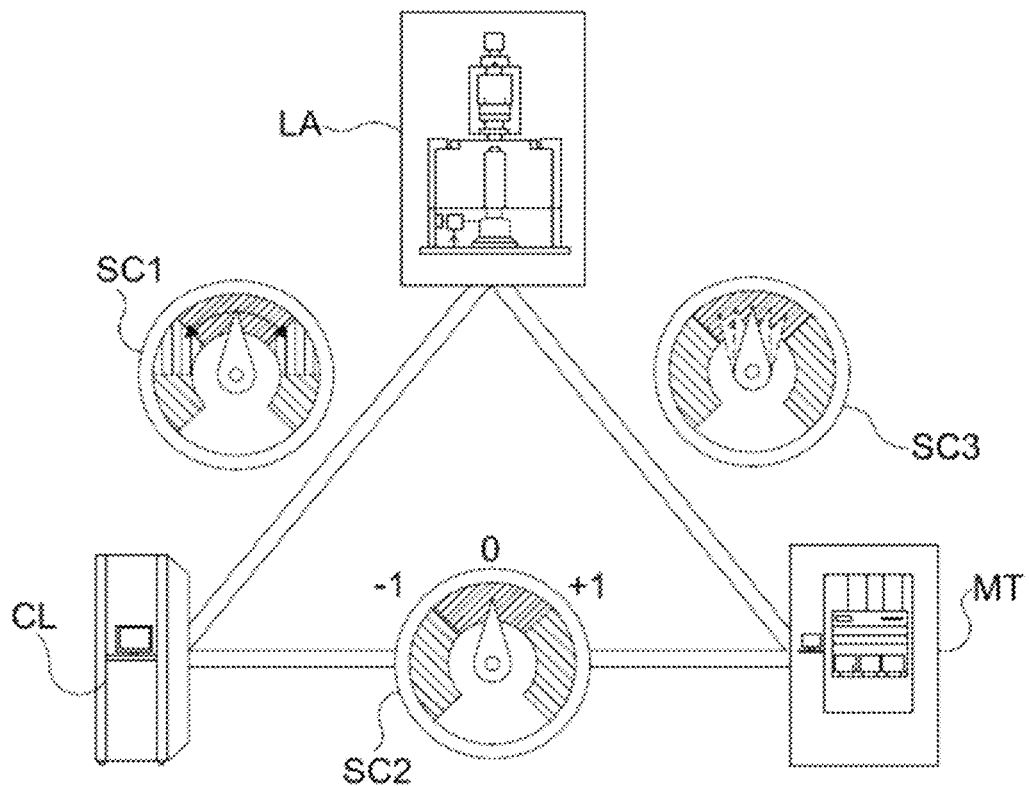
FIG. 3 depicts a schematic representation of holistic lithography, representing a cooperation between three key technologies to optimize semiconductor manufacturing.

Typically the patterning process in a lithographic apparatus LA is one of the most critical steps in the processing which requires high accuracy of dimensioning and placement of structures on the substrate W. To ensure this high accuracy, three systems may be combined in a so called "holistic" control environment as schematically depicted in FIG. 3. One of these systems is the lithographic apparatus LA which is (virtually) connected to a metrology tool MT (a second system) and to a computer system CL (a third system). The key of such "holistic" environment is to optimize the cooperation between these three systems to enhance the overall process window and provide tight control loops to ensure that the patterning performed by the lithographic apparatus LA stays within a process window. The process window defines a range of process parameters (e.g. dose, focus, overlay) within which a specific manufacturing process yields a defined result (e.g. a functional semiconductor device)—typically within which the process parameters in the lithographic process or patterning process are allowed to vary.

The computer system CL may use (part of) the design layout to be patterned to predict which resolution enhancement techniques to use and to perform computational lithography simulations and calculations to determine which mask layout and lithographic apparatus settings achieve the largest overall process window of the patterning process (depicted in FIG. 3 by the double arrow in the first scale SC1). Typically, the resolution enhancement techniques are arranged to match the patterning possibilities of the lithographic apparatus LA. The computer system CL may also be used to detect where within the process window the lithographic apparatus LA is currently operating (e.g. using input from the metrology tool MT) to predict whether defects may be present due to e.g. sub-optimal processing (depicted in FIG. 3 by the arrow pointing "0" in the second scale SC2).

The metrology tool MT may provide input to the computer system CL to enable accurate simulations and predictions, and may provide feedback to the lithographic apparatus LA to identify possible drifts, e.g. in a calibration status of the lithographic apparatus LA (depicted in FIG. 3 by the multiple arrows in the third scale SC3). Different types of metrology tools MT for measuring one or more properties relating to a lithographic apparatus and/or a substrate to be patterned will now be described.

In lithographic processes, it is desirable to make frequently measurements of the structures created, e.g., for process control and verification. Tools to make such measurement are typically called metrology tools MT. Different types of metrology tools MT for making such measurements are known, including scanning electron microscopes or various forms of scatterometer metrology tools MT. Scatterometers are versatile instruments which allow measurements of the parameters of a lithographic process by having a sensor in the pupil or a conjugate plane with the pupil of the objective of the scatterometer, measurements usually referred as pupil based measurements, or by having the sensor in the image plane or a plane conjugate with the image plane, in which case the measurements are usually referred as image or field based measurements. Such scatterometers and the associated measurement techniques are further described in patent applications US20100328655, US2011102753A1, US20120044470A, US20110249244, US20110026032 or EP1,628,164A, incorporated herein by reference in their entirety. Aforementioned scatterometers may measure gratings using light from soft x-ray and visible to near-IR wavelength range.

In a first embodiment, the scatterometer MT is an angular resolved scatterometer. In such a scatterometer reconstruction methods may be applied to the measured signal to reconstruct or calculate properties of the grating. Such reconstruction may, for example, result from simulating interaction of scattered radiation with a mathematical model of the target structure and comparing the simulation results with those of a measurement. Parameters of the mathematical model are adjusted until the simulated interaction produces a diffraction pattern similar to that observed from the real target.

In a second embodiment, the scatterometer MT is a spectroscopic scatterometer MT. In such spectroscopic scatterometer MT, the radiation emitted by a radiation source is directed onto the target and the reflected or scattered radiation from the target is directed to a spectrometer detector, which measures a spectrum (i.e. a measurement of intensity as a function of wavelength) of the specular reflected radiation. From this data, the structure or profile of the target giving rise to the detected spectrum may be reconstructed, e.g. by Rigorous Coupled Wave Analysis and non-linear regression or by comparison with a library of simulated spectra.

In a third embodiment, the scatterometer MT is a ellipsometric scatterometer. The ellipsometric scatterometer allows for determining parameters of a lithographic process by measuring scattered radiation for each polarization state. Such metrology apparatus emits polarized light (such as linear, circular, or elliptic) by using, for example, appropriate polarization filters in the illumination section of the metrology apparatus. A source suitable for the metrology apparatus may provide polarized radiation as well. Various embodiments of existing ellipsometric scatterometers are described in U.S. patent application Ser. Nos. 11/451,599, 11/708,678, 12/256,780, 12/486,449, 12/920,968, 12/922,587, 13/000,229, 13/033,135, 13/533,110 and 13/891,410 incorporated herein by reference in their entirety.

In one embodiment of the scatterometer MT, the scatterometer MT is adapted to measure the overlay of two misaligned gratings or periodic structures by measuring asymmetry in the reflected spectrum and/or the detection configuration, the asymmetry being related to the extent of the overlay. The two (typically overlapping) grating structures may be applied in two different layers (not necessarily consecutive layers), and may be formed substantially at the same position on the wafer. The scatterometer may have a symmetrical detection configuration as described e.g. in co-owned patent application EP1,628,164A, such that any asymmetry is clearly distinguishable. This provides a straightforward way to measure misalignment in gratings. Further examples for measuring overlay error between the two layers containing periodic structures as target is measured through asymmetry of the periodic structures may be found in PCT patent application publication no. WO 2011/012624 or U.S. patent application US20160161863, incorporated herein by reference in its entirety.

Other parameters of interest may be focus and dose. Focus and dose may be determined simultaneously by scatterometry (or alternatively by scanning electron microscopy) as described in U.S. patent application US2011-0249244, incorporated herein by reference in its entirety. A single structure may be used which has a unique combination of critical dimension and sidewall angle measurements for each point in a focus energy matrix (FEM—also referred to as Focus Exposure Matrix). If these unique combinations of critical dimension and sidewall angle are available, the focus and dose values may be uniquely determined from these measurements.

A metrology target may be an ensemble of composite gratings, formed by a lithographic process, mostly in resist, but also after etch process for example. Typically the pitch and line-width of the structures in the gratings strongly depend on the measurement optics (in particular the NA of the optics) to be able to capture diffraction orders coming from the metrology targets. As indicated earlier, the diffracted signal may be used to determine shifts between two layers (also referred to 'overlay') or may be used to reconstruct at least part of the original grating as produced by the lithographic process. This reconstruction may be used to provide guidance of the quality of the lithographic process and may be used to control at least part of the lithographic process. Targets may have smaller sub-segmentation which are configured to mimic dimensions of the functional part of the design layout in a target. Due to this sub-segmentation, the targets will behave more similar to the functional part of the design layout such that the overall process parameter measurements resembles the functional part of the design layout better. The targets may be measured in an underfilled mode or in an overfilled mode. In the underfilled mode, the measurement beam generates a spot that is smaller than the overall target. In the overfilled mode, the measurement beam generates a spot that is larger than the overall target. In such overfilled mode, it may also be possible to measure different targets simultaneously, thus determining different processing parameters at the same time.

Overall measurement quality of a lithographic parameter using a specific target is at least partially determined by the measurement recipe used to measure this lithographic parameter. The term "substrate measurement recipe" may include one or more parameters of the measurement itself, one or more parameters of the one or more patterns measured, or both. For example, if the measurement used in a substrate measurement recipe is a diffraction-based optical measurement, one or more of the parameters of the measurement may include the wavelength of the radiation, the polarization of the radiation, the incident angle of radiation relative to the substrate, the orientation of radiation relative to a pattern on the substrate, etc. One of the criteria to select a measurement recipe may, for example, be a sensitivity of one of the measurement parameters to processing variations. More examples are described in U.S. patent application US2016-0161863 and published U.S. patent application US2016/0370717A1 incorporated herein by reference in its entirety.

Figure 4:
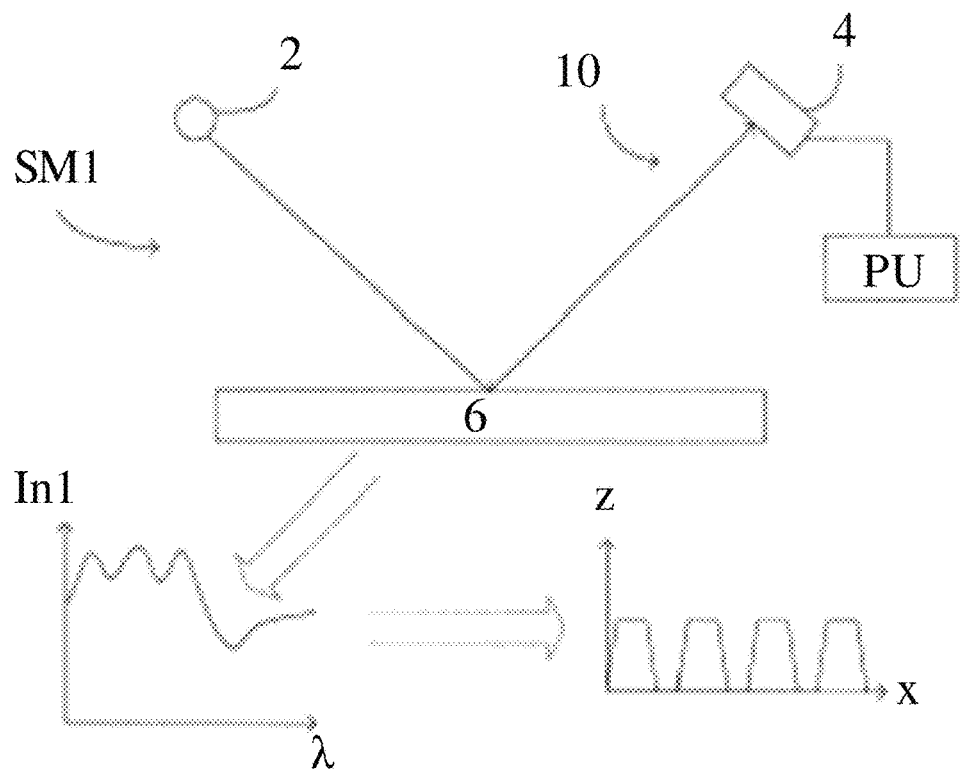
FIG. 4 depicts a schematic overview of a scatterometer metrology tool.

A metrology apparatus, such as a scatterometer SM1, is depicted in FIG. 4. It comprises a broadband (white light) radiation projector 2 which projects radiation onto a substrate 6. The reflected or scattered radiation is passed to a spectrometer detector 4, which measures a spectrum 10 (i.e. a measurement of intensity In1 as a function of wavelength λ) of the specular reflected radiation. From this data, the structure or profile giving rise to the detected spectrum may be reconstructed by processing unit PU, e.g. by Rigorous Coupled Wave Analysis and non-linear regression or by comparison with a library of simulated spectra as shown at the bottom of FIG. 4. In general, for the reconstruction, the general form of the structure is known and some parameters are assumed from knowledge of the process by which the structure was made, leaving only a few parameters of the structure to be determined from the scatterometry data. Such a scatterometer may be configured as a normal-incidence scatterometer or an oblique-incidence scatterometer.

In lithographic processes, it is desirable to make frequently measurements of the structures created, e.g., for process control and verification. Various tools for making such measurements are known, including scanning electron microscopes or various forms of metrology apparatuses, such as scatterometers. Examples of known scatterometers often rely on provision of dedicated metrology targets, such as underfilled targets (a target, in the form of a simple grating or overlapping gratings in different layers, that is large enough that a measurement beam generates a spot that is smaller than the grating) or overfilled targets (whereby the illumination spot partially or completely contains the target). Further, the use of metrology tools, for example an angular resolved scatterometer illuminating an underfilled target, such as a grating, allows the use of so-called reconstruction methods where the properties of the grating can be calculated by simulating interaction of scattered radiation with a mathematical model of the target structure and comparing the simulation results with those of a measurement. Parameters of the model are adjusted until the simulated interaction produces a diffraction pattern similar to that observed from the real target.

Scatterometers are versatile instruments which allow measurements of the parameters of a lithographic process by having a sensor in the pupil or a conjugate plane with the pupil of the objective of the scatterometer, measurements usually referred as pupil based measurements, or by having the sensor in the image plane or a plane conjugate with the image plane, in which case the measurements are usually referred as image or field based measurements. Such scatterometers and the associated measurement techniques are further described in patent applications US20100328655, US2011102753A1, US20120044470A, US20110249244, US20110026032 or EP1,628,164A, incorporated herein by reference in their entirety. Aforementioned scatterometers can measure in one image multiple targets from from multiple gratings using light from soft x-ray and visible to near-IR wave range.

A topography measurement system {XE "topography measurement system"}, level sensor {XE "level sensor"} or height {XE "height"} sensor {XE "height sensor"}, and which may be integrated in the lithographic apparatus, is arranged to measure a topography of a top surface of a substrate {XE "substrate"} (or wafer {XE "wafer"}). A map of the topography of the substrate, also referred to as height map {XE "height map"}, may be generated from these measurements indicating a height of the substrate as a function of the position on the substrate. This height map may subsequently be used to correct the position of the substrate during transfer of the pattern on the substrate, in order to provide an aerial image {XE "aerial image"} of the patterning device in a properly focus position on the substrate. It will be understood that "height" in this context refers to a dimension broadly out of the plane to the substrate (also referred to as Z-axis). Typically, the level or height sensor performs measurements at a fixed location (relative to its own optical system) and a relative movement between the substrate and the optical system of the level or height sensor results in height measurements at locations across the substrate.

Figure 5:
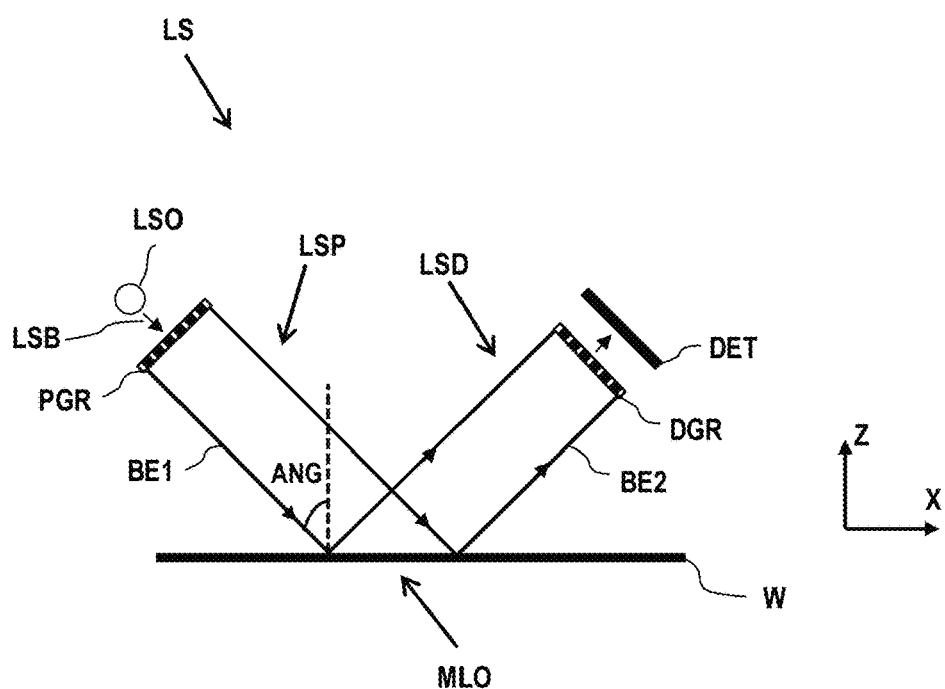
FIG. 5 depicts a schematic overview of a level sensor metrology tool.

An example of a level or height {XE "height"} sensor {XE "height sensor"} LS as known in the art is schematically shown in FIG. 5, which illustrates only the principles of operation. In this example, the level sensor {XE "level sensor"} comprises an optical system, which includes a projection unit {XE "projection unit"} LSP and a detection unit {XE "detection unit"} LSD. The projection unit LSP comprises a radiation source {XE "radiation source"} LSO providing a beam of radiation LSB which is imparted by a projection grating {XE "projection grating"} PGR of the projection unit LSP. The radiation source LSO may be, for example, a narrowband or broadband radiation source, such as a supercontinuum light source, polarized or non-polarized, pulsed or continuous, such as a polarized or non-polarized laser beam. The radiation source LSO may include a plurality of radiation sources having different colors, or wavelength ranges, such as a plurality of LEDs. The radiation source LSO of the level sensor LS is not restricted to visible radiation, but may additionally or alternatively encompass UV and/or IR radiation and any range of wavelengths suitable to reflect from a surface of a substrate {XE "substrate"}.

The projection grating {XE "projection grating"} PGR is a periodic grating comprising a periodic structure resulting in a beam of radiation BE1 having a periodically varying intensity. The beam of radiation BE1 with the periodically varying intensity is directed towards a measurement location MLO on a substrate {XE "substrate"} W having an angle of incidence ANG with respect to an axis perpendicular (Z-axis) to the incident substrate surface between 0 degrees and 90 degrees, typically between 70 degrees and 80 degrees. At the measurement location MLO, the patterned beam of radiation BE1 is reflected by the substrate W (indicated by arrows BE2) and directed towards the detection unit {XE "detection unit"} LSD.

In order to determine the height {XE "height"} level at the measurement location MLO, the level sensor {XE "level sensor"} further comprises a detection system comprising a detection grating {XE "detection grating"} DGR, a detector DET and a processing unit (not shown) for processing an output signal of the detector DET. The detection grating DGR may be identical to the projection grating {XE "projection grating"} PGR. The detector DET produces a detector output signal indicative of the light received, for example indicative of the intensity of the light received, such as a photodetector, or representative of a spatial distribution of the intensity received, such as a camera. The detector DET may comprise any combination of one or more detector types.

By means of triangulation techniques, the height {XE "height"} level at the measurement location MLO can be determined. The detected height level is typically related to the signal strength as measured by the detector DET, the signal strength having a periodicity that depends, amongst others, on the design of the projection grating {XE "projection grating"} PGR and the (oblique) angle of incidence ANG.

The projection unit {XE "projection unit"} LSP and/or the detection unit {XE "detection unit"} LSD may include further optical elements, such as lenses and/or mirrors, along the path of the patterned beam of radiation between the projection grating {XE "projection grating"} PGR and the detection grating {XE "detection grating"} DGR (not shown).

In an embodiment, the detection grating {XE "detection grating"} DGR may be omitted, and the detector DET may be placed at the position where the detection grating DGR is located. Such a configuration provides a more direct detection of the image of the projection grating {XE "projection grating"} PGR.

In order to cover the surface of the substrate {XE "substrate"} W effectively, a level sensor {XE "level sensor"} LS may be configured to project an array of measurement beams BE1 onto the surface of the substrate W, thereby generating an array of measurement areas MLO or spots covering a larger measurement range.

Various height {XE "height"} sensors of a general type are disclosed for example in U.S. Pat. No. 7,2653,64 and U.S. Pat. No. 7,646,471, both incorporated by reference. A height sensor {XE "height sensor"} using UV radiation instead of visible or infrared radiation is disclosed in US2010233600A1, incorporated by reference. In WO2016102127A1, incorporated by reference, a compact height sensor is described which uses a multi-element detector to detect and recognize the position of a grating image, without needing a detection grating {XE "detection grating"}.

The position measurement system PMS may comprise any type of sensor that is suitable to determine a position of the substrate support WT. The position measurement system PMS may comprise any type of sensor that is suitable to determine a position of the mask support MT. The sensor may be an optical sensor such as an interferometer or an encoder. The position measurement system PMS may comprise a combined system of an interferometer and an encoder. The sensor may be another type of sensor, such as a magnetic sensor, a capacitive sensor or an inductive sensor. The position measurement system PMS may determine the position relative to a reference, for example the metrology frame MF or the projection system PS. The position measurement system PMS may determine the position of the substrate table WT and/or the mask support MT by measuring the position or by measuring a time derivative of the position, such as velocity or acceleration.

The position measurement system PMS may comprise an encoder system. An encoder system is known from for example, U.S. patent application US2007/0058173A1, filed on Sep. 7, 2006, hereby incorporated by reference. The encoder system comprises an encoder head, a grating and a sensor. The encoder system may receive a primary radiation beam and a secondary radiation beam. Both the primary radiation beam as well as the secondary radiation beam originate from the same radiation beam, i.e., the original radiation beam. At least one of the primary radiation beam and the secondary radiation beam is created by diffracting the original radiation beam with the grating. If both the primary radiation beam and the secondary radiation beam are created by diffracting the original radiation beam with the grating, the primary radiation beam needs to have a different diffraction order than the secondary radiation beam. Different diffraction orders are, for example, $+1^{st}$ order, $-1^{st}$ order, $+2^{nd}$ order and $-2^{nd}$ order. The encoder system optically combines the primary radiation beam and the secondary radiation beam into a combined radiation beam. A sensor in the encoder head determines a phase or phase difference of the combined radiation beam. The sensor generates a signal based on the phase or phase difference. The signal is representative of a position of the encoder head relative to the grating. One of the encoder head and the grating may be arranged on the substrate structure WT. The other of the encoder head and the grating may be arranged on the metrology frame MF or the base frame BF. For example, a plurality of encoder heads are arranged on the metrology frame MF, whereas a grating is arranged on a top surface of the substrate support WT. In another example, a grating is arranged on a bottom surface of the substrate support WT, and an encoder head is arranged below the substrate support WT.

The position measurement system PMS may comprise an interferometer system. An interferometer system is known from, for example, U.S. Pat. No. 6,020,964, filed on Jul. 13, 1998, hereby incorporated by reference. The interferometer system may comprise a beam splitter, a mirror, a reference mirror and a sensor. A beam of radiation is split by the beam splitter into a reference beam and a measurement beam. The measurement beam propagates to the mirror and is reflected by the mirror back to the beam splitter. The reference beam propagates to the reference mirror and is reflected by the reference mirror back to the beam splitter. At the beam splitter, the measurement beam and the reference beam are combined into a combined radiation beam. The combined radiation beam is incident on the sensor. The sensor determines a phase or a frequency of the combined radiation beam. The sensor generates a signal based on the phase or the frequency. The signal is representative of a displacement of the mirror. In an embodiment, the mirror is connected to the substrate support WT. The reference mirror may be connected to the metrology frame MF. In an embodiment, the measurement beam and the reference beam are combined into a combined radiation beam by an additional optical component instead of the beam splitter.

In the manufacture of complex devices, typically many lithographic patterning steps are performed, thereby forming functional features in successive layers on the substrate {XE "substrate"}. A critical aspect of performance of the lithographic apparatus is therefore the ability to place the applied pattern correctly and accurately in relation to features laid down in previous layers (by the same apparatus or a different lithographic apparatus). For this purpose, the substrate is provided with one or more sets of marks. Each mark {XE "mark"} is a structure whose position can be measured at a later time using a position sensor {XE "position sensor"}, typically an optical position sensor. The position sensor may be referred to as "alignment sensor {XE "alignment sensor"}" and marks may be referred to as "alignment marks {XE "alignment mark"}". A mark may also be referred to as a metrology target.

A lithographic apparatus may include one or more (e.g. a plurality of) alignment sensors by which positions of alignment marks {XE "alignment mark"} provided on a substrate {XE "substrate"} can be measured accurately. Alignment (or position) sensors may use optical phenomena such as diffraction and interference to obtain position information from alignment marks {XE "alignment mark"} formed on the substrate. An example of an alignment sensor {XE "alignment sensor"} used in current lithographic apparatus is based on a self-referencing interferometer as described in U.S. Pat. No. 6,961,116. Various enhancements and modifications of the position sensor {XE "position sensor"} have been developed, for example as disclosed in US2015261097A1. The contents of all of these publications are incorporated herein by reference.

A mark {XE "mark"}, or alignment mark, may comprise a series of bars formed on or in a layer provided on the substrate {XE "substrate"} or formed (directly) in the substrate. The bars may be regularly spaced and act as grating {XE "grating"} lines so that the mark can be regarded as a diffraction grating with a well-known spatial period (pitch). Depending on the orientation of these grating lines, a mark may be designed to allow measurement of a position along the X axis, or along the Y axis (which is oriented substantially perpendicular to the X axis). A mark comprising bars that are arranged at +45 degrees and/or −45 degrees with respect to both the X- and Y-axes allows for a combined X- and Y-measurement using techniques as described in US2009/195768A, which is incorporated by reference.

The alignment sensor {XE "alignment sensor"} scans each mark {XE "mark"} optically with a spot of radiation to obtain a periodically varying signal, such as a sine wave. The phase of this signal is analyzed, to determine the position of the mark and, hence, of the substrate {XE "substrate"} relative to the alignment sensor, which, in turn, is fixated relative to a reference frame {XE "reference frame"} of a lithographic apparatus. So-called coarse and fine marks may be provided, related to different (coarse and fine) mark dimensions, so that the alignment sensor can distinguish between different cycles of the periodic signal, as well as the exact position (phase) within a cycle. Marks of different pitches may also be used for this purpose.

Measuring the position of the marks may also provide information on a deformation of the substrate {XE "substrate"} on which the marks are provided, for example in the form of a wafer grid {XE "wafer grid"}. Deformation of the substrate may occur by, for example, electrostatic clamping of the substrate to the substrate table and/or heating of the substrate when the substrate is exposed to radiation.

Figure 6:
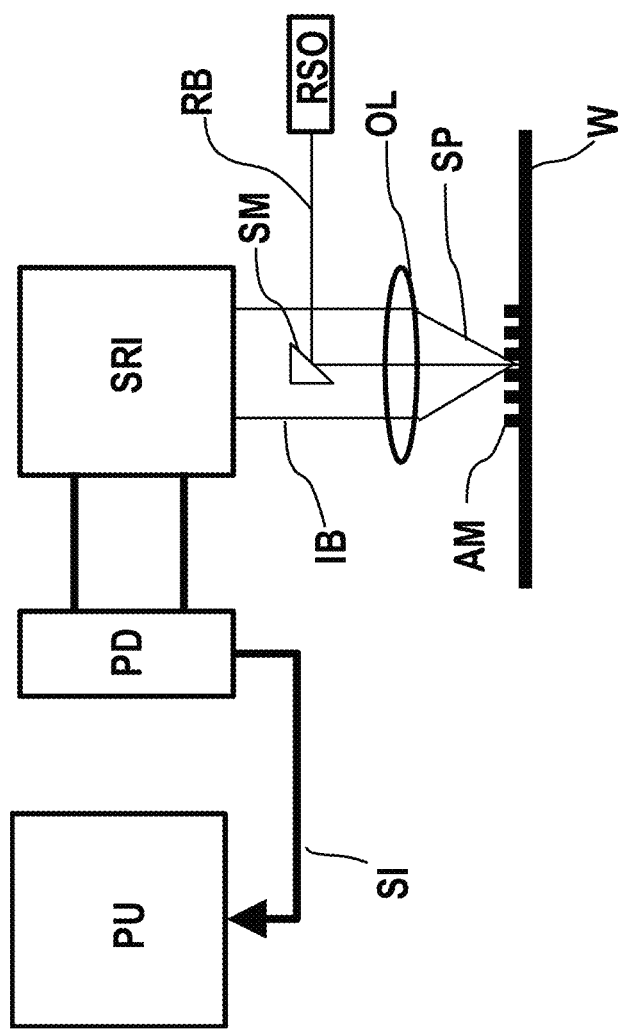
FIG. 6 depicts a schematic overview of an alignment sensor metrology tool.

FIG. 6 is a schematic block diagram of an embodiment of a known alignment sensor {XE "alignment sensor"} AS, such as is described, for example, in U.S. Pat. No. 6,961,116, and which is incorporated by reference. Radiation source RSO provides a beam RB of radiation of one or more wavelengths, which is diverted by diverting optics onto a mark {XE "mark"}, such as mark AM located on substrate {XE "substrate"} W, as an illumination spot SP. In this example the diverting optics comprises a spot mirror SM and an objective lens OL. The illumination spot SP, by which the mark AM is illuminated, may be slightly smaller in diameter than the width of the mark itself Radiation diffracted by the mark {XE "mark"} AM is collimated (in this example via the objective lens OL) into an information-carrying beam IB. The term "diffracted" is intended to include zero-order diffraction from the mark (which may be referred to as reflection). A self-referencing interferometer SRI, e.g. of the type disclosed in U.S. Pat. No. 6,961,116 mentioned above, interferes the beam IB with itself after which the beam is received by a photodetector PD. Additional optics (not shown) may be included to provide separate beams in case more than one wavelength is created by the radiation source RSO. The photodetector may be a single element, or it may comprise a number of pixels, if desired. The photodetector may comprise a sensor array.

The diverting optics, which in this example comprises the spot mirror SM, may also serve to block zero order radiation reflected from the mark {XE "mark"}, so that the information-carrying beam IB comprises only higher order diffracted radiation from the mark AM (this is not essential to the measurement, but improves signal to noise ratios).

Intensity signals SI are supplied to a processing unit PU. By a combination of optical processing in the block SRI and computational processing in the unit PU, values for X- and Y-position on the substrate {XE "substrate"} relative to a reference frame {XE "reference frame"} are output.

A single measurement of the type illustrated only fixes the position of the mark {XE "mark"} within a certain range corresponding to one pitch of the mark. Coarser measurement techniques are used in conjunction with this to identify which period of a sine wave is the one containing the marked position. The same process at coarser and/or finer levels may be repeated at different wavelengths for increased accuracy and/or for robust detection of the mark irrespective of the materials from which the mark is made, and materials on and/or below which the mark is provided. The wavelengths may be multiplexed and de-multiplexed optically so as to be processed simultaneously, and/or they may be multiplexed by time division or frequency division.

In this example, the alignment sensor {XE "alignment sensor"} and spot SP remain stationary, while it is the substrate {XE "substrate"} W that moves. The alignment sensor can thus be mounted rigidly and accurately to a reference frame {XE "reference frame"}, while effectively scanning the mark {XE "mark" } AM in a direction opposite to the direction of movement of substrate W. The substrate W is controlled in this movement by its mounting on a substrate support and a substrate positioning system controlling the movement of the substrate support. A substrate support position sensor {XE "position sensor"} (e.g. an interferometer) measures the position of the substrate support (not shown). In an embodiment, one or more (alignment) marks are provided on the substrate support. A measurement of the position of the marks provided on the substrate support allows the position of the substrate support as determined by the position sensor to be calibrated (e.g. relative to a frame to which the alignment system is connected). A measurement of the position of the alignment marks {XE "alignment mark"} provided on the substrate allows the position of the substrate relative to the substrate support to be determined.

Metrology tools MT, such as a scatterometer, topography measurement system, or position measurement system mentioned above may use radiation originating from a radiation source to perform a measurement. The properties of the radiation used by a metrology tool may affect the type and quality of measurements that may be performed. For some applications, it may be advantageous to use multiple radiation frequencies to measure a substrate, for example broadband radiation may be used. Multiple different frequencies may be able to propagate, irradiate, and scatter off a metrology target with no or minimal interference with other frequencies. Therefore different frequencies may for example be used to obtain more metrology data simultaneously. Different radiation frequencies may also be able to interrogate and discover different properties of a metrology target. Broadband radiation may be useful in metrology systems MT such as for example level sensors, alignment mark measurement systems, scatterometry tools, or inspection tools. A broadband radiation source may be a supercontinuum source.

High quality broadband radiation, for example supercontinuum radiation, may be difficult to generate. One method for generating broadband radiation may be to broaden high-power narrow band or single frequency input radiation, for example making use of non-linear, higher order effects. The input radiation (which may be produced using a laser) may be referred to as pump radiation. To obtain high power radiation for broadening effects, radiation may be confined into a small area so that strongly localised high intensity radiation is achieved. In those areas, the radiation may interact with broadening structures and/or materials forming a non-linear medium so as to create broadband output radiation. In the high intensity radiation areas, different materials and/or structures may be used to enable and/or improve radiation broadening by providing a suitable non-linear medium.

In some implementations, as discussed further below with reference to FIGS. 9 to 11, methods and apparatus for broadening input radiation may use a fiber for confining input radiation, and for broadening the input radiation to output broadband radiation. The fiber may be a hollow core fiber, and may comprise internal structures to achieve effective guiding and confinement of radiation in the fiber. The fiber may be a hollow core photonic crystal fiber (HC-PCF), which is particularly suitable for strong radiation confinement, predominantly inside the hollow core of the fiber, achieving high radiation intensities. The hollow core of the fiber may be filled with a gas acting as a broadening medium for broadening input radiation. Such a fiber and gas arrangement may be used to create a supercontinuum radiation source. Radiation input to the fiber may be electromagnetic radiation, for example radiation in one or more of the infrared, visible, UV, and extreme UV spectra. The output radiation may consist of or comprise broadband radiation, which may be referred to herein as white light.

Some embodiments of the present invention relate to a new design of optical fiber for use in such a broadband radiation source, and a broadband radiation source comprising the new optical fiber. The new optical fiber is a hollow-core, photonic crystal fiber (HC-PCF). In particular, the new optical fiber is a hollow-core, photonic crystal fiber of a type comprising anti-resonant structures for confinement of radiation. Such fibers comprising anti-resonant structures are known in the art as anti-resonant fibers, tubular fibers, single-ring fibers, negative curvature fibers or inhibited coupling fibers. Various different designs of such fibers are known in the art.

It will be appreciated that an anti-resonance element is intended to mean an element which is arranged to confine radiation within the hollow core predominantly by anti-resonance. In particular, the term anti-resonance element is not intended to encompass elements that are arranged to confine radiation within the hollow core by predominantly creating a photonic bandgap in the cladding portion (such as, for example, Kagome photonic crystal fibers). Pure photonic bandgap fibers offer very low loss over a very limited bandwidth. Optical fibers which guide radiation using anti-resonance elements can have a broader transmission window (i.e. having a larger transmission bandwidth) than photonic bandgap fibers. Advantageously, such fibers may therefore be better suited for use in an apparatus for receiving input radiation and broadening a frequency range of the input radiation so as to provide output radiation (for example a supercontinuum source).

Figure 7:
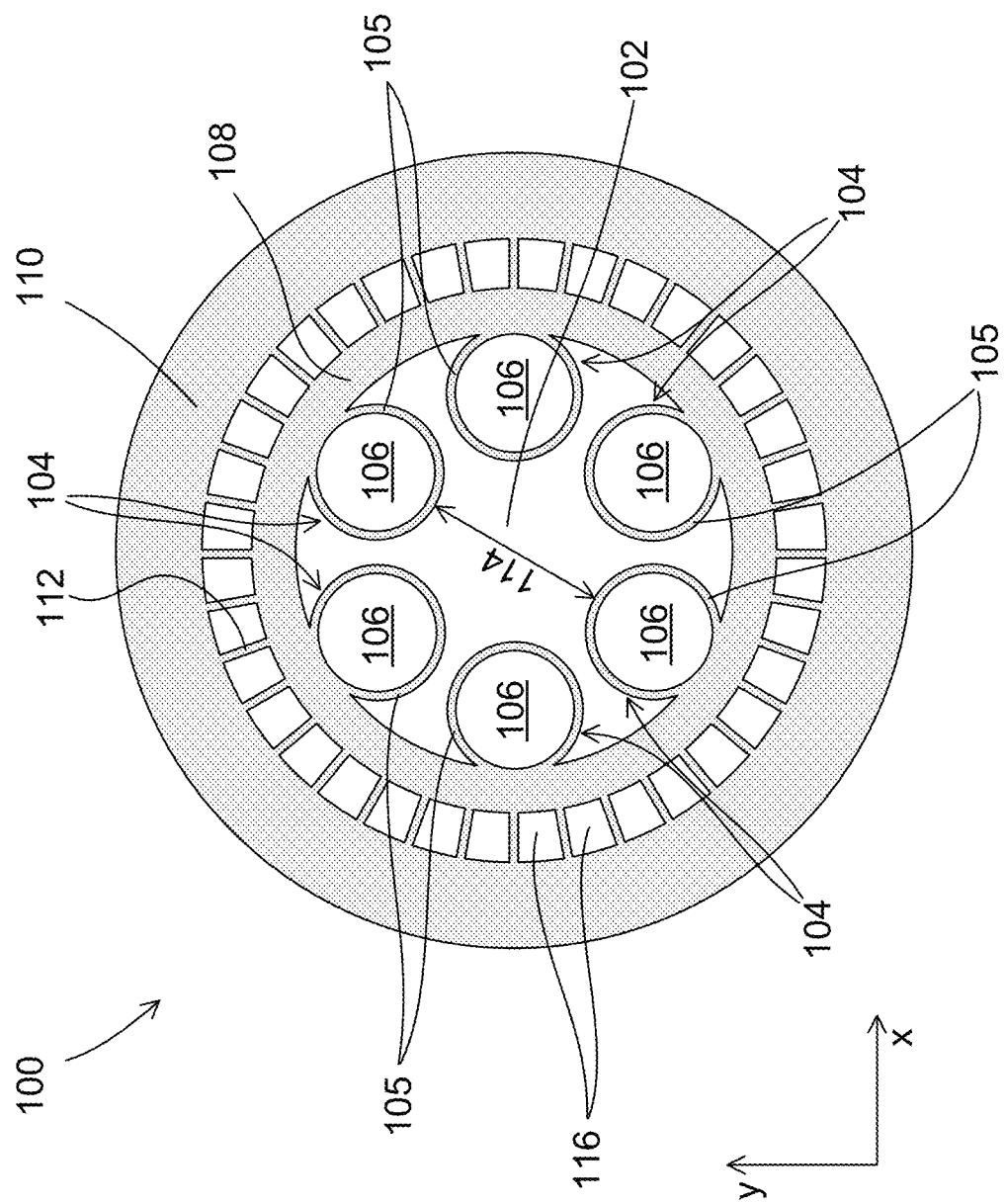
FIG. 7 is a schematic cross sectional view of a new optical fiber according to an embodiment of the present invention in a transverse plane (i.e. perpendicular to an axis of the optical fiber)
Figure 8:
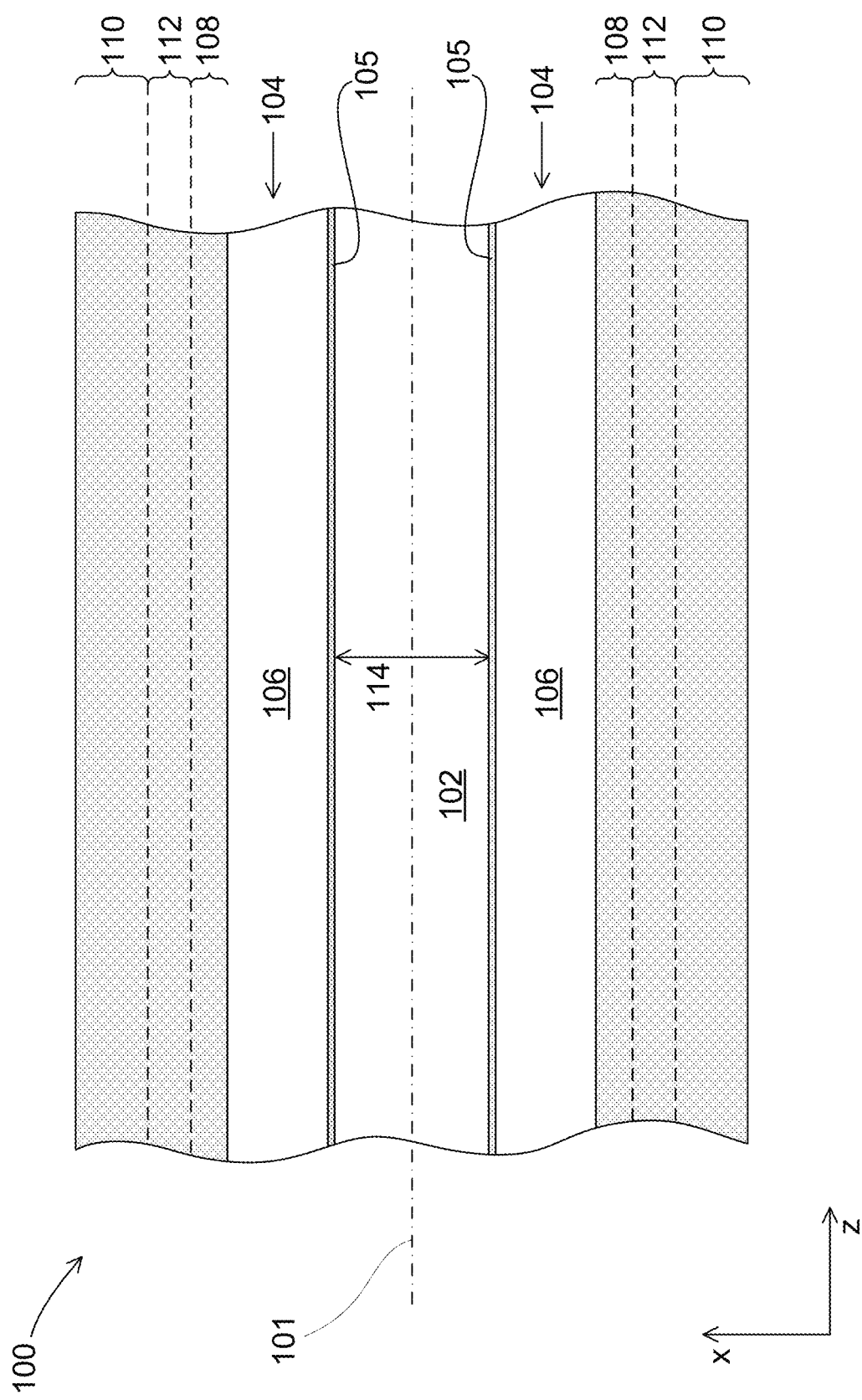

The new design of optical fiber is now described with reference to FIGS. 7 and 8. FIGS. 7 and 8 are schematic cross sectional views of the new optical fiber 100 in two mutually perpendicular planes.

The optical fiber 100 comprises an elongate body, which is longer in one dimension compared to the other two dimensions of the fiber 102. This longer dimension may be referred to as an axial direction and may define an axis 101 of the optical fiber 100. The two other dimensions define a plane which may be referred to as a transverse plane. FIG. 7 shows a cross-section of the optical fiber 100 in the transverse plane (i.e. perpendicular to the axis 101), which is labelled as the x-y plane. FIG. 8 shows a cross-section of the optical fiber 100 in a plane containing the axis 101, in particular the x-z plane. The transverse cross-section of the optical fiber 100 may be substantially constant along the fiber axis 101.

It will be appreciated that the optical fiber 100 has some degree of flexibility and therefore the direction of the axis 101 will not, in general, be uniform along the length of the optical fiber 100. The terms such as the optical axis 101, the transverse cross-section and the like will be understood to mean the local optical axis 101, the local transverse cross-section and so on. Furthermore, where components are described as being cylindrical or tubular these terms will be understood to encompass such shapes that may have been distorted as the optical fiber 100 is flexed.

The optical fiber 100 may have any length and it will be appreciated that the length of the optical fiber 100 may be dependent on the application (for example the amount of spectral broadening that is desired in applications within a supercontinuum radiation source). The optical fiber 100 may have a length between 1 cm and 10 m, for example, the optical fiber 100 may have a length between 10 cm and 100 cm.

The optical fiber 100 comprises: a hollow core 102; a cladding portion surrounding the hollow core 102; and a support portion surrounding and supporting the cladding portion. The cladding portion comprises a plurality of anti-resonance elements for guiding radiation through the hollow core 102. In particular, the plurality of anti-resonance elements are arranged to confine radiation that propagates through the optical fiber 100 predominantly inside the hollow core 102 and to guide the radiation along the optical fiber 100. The hollow core 102 of the optical fiber 100 may be disposed substantially in a central region of the optical fiber 100, so that the axis 101 of the optical fiber 100 may also define an axis of the hollow core 102 of the optical fiber 100.

The cladding portion comprises a plurality of anti-resonance elements for guiding radiation propagating through the optical fiber 100. In particular, in this embodiment, the cladding portion comprises a single ring of six tubular capillaries 104. Each of the tubular capillaries 104 acts as an anti-resonance element.

The capillaries 104 may also be referred to as tubes. The capillaries 104 may be circular in cross section, or may have another shape. Each capillary 104 comprises a generally cylindrical wall portion 105 that at least partially defines the hollow core 102 of the optical fiber 100 and separates the hollow core 102 from an anti-resonance cavity 106. It will be appreciated that the wall portion 105 may act as an anti-reflecting Fabry-Perot resonator for radiation that propagates through the hollow core 102 (and which may be incident on the wall portion 105 at a grazing incidence angle). The thickness of the wall portion 105 may be suitable so as to ensure that reflection back into the hollow core 102 is generally enhanced whereas transmission into the anti-resonance cavity 106 is generally supressed. In some embodiments, the capillary wall portion 105 may have a thickness between 0.01-10.0 µm.

It will be appreciated that, as used herein, the term cladding portion is intended to mean a portion of the optical fiber 100 for guiding radiation propagating through the optical fiber 100 (i.e. the capillaries 104 which confine said radiation within the hollow core 102). The radiation may be confined in the form of transverse modes, propagating along the fiber axis 101.

The support portion comprises an inner support portion 108, an outer support portion 110 and a deformable connecting portion 112. The deformable connecting portion 112 connects the inner support portion 108 to the outer support portion 110. The deformable connecting portion 112 may alternatively be referred to as a stress-absorbing portion.

The inner support portion 108 is generally tubular and supports the six capillaries 104 of the cladding portion. The six capillaries 104 are distributed evenly around an inner surface if the inner support portion 108. The six capillaries 104 may be described as being disposed in a generally hexagonal formation.

The capillaries 104 are arranged so that each capillary is not in contact with any of the other capillaries 104. Each of the capillaries 104 is in contact with the inner support portion 108 and spaced apart from adjacent capillaries 104 in the ring structure. Such an arrangement may be beneficial since it may increase a transmission bandwidth of the optical fiber 100 (relative, for example, to an arrangement wherein the capillaries are in contact with each other). Alternatively, in some embodiments, each of the capillaries 104 may be in contact adjacent capillaries 104 in the ring structure.

The six capillaries 104 of the cladding portion are disposed in a ring structure around the hollow core 102. An inner surface of the ring structure of capillaries 104 at least partially defines the hollow core 102 of the optical fiber 100. The diameter of the hollow core 102 (which may be defined as the smallest dimension between opposed capillaries, indicated by arrow 114) may be between 10 and 1000 µm. The diameter 114 of the hollow core 102 may affect the mode field parameter, impact loss, dispersion, modal plurality, and non-linearity properties of the hollow core optical fiber 100.

In this embodiment, the cladding portion comprises a single ring arrangement of capillaries 104 (which act as anti-resonance elements). Therefore, a line in any radial direction from a center of the hollow core 102 to an exterior of the optical fiber 100 passes through no more than one capillary 104.

It will be appreciated that other embodiments may be provided with different arrangements of anti-resonance elements. These may include arrangements having multiple rings of anti-resonance elements and arrangements having nested anti-resonance elements. Furthermore, although the embodiment shown in FIGS. 7 and 8 comprises a ring of six capillaries, in other embodiments, one or more rings comprising any number of anti-resonance elements (for example 4, 5, 6, 7, 8, 9, 10, 11 or 12 capillaries) may be provided in the cladding portion.

The outer support portion 110 is generally tubular and supports the inner support portion 108 via the deformable connecting portion 112. The deformable connecting portion 112 is susceptible to being deformed. That is, the shape and/or dimensions of the deformable connecting portion 112 may change in response to applied stress. In particular, the deformable connecting portion 112 may be more susceptible to such deformation than other parts of the optical fiber 100 such as, for example, the inner support portion 108.

The deformable connecting portion 112 comprises a ring structure arranged around the inner support portion 108. This ring structure comprises a plurality of apertures 116 interspersed with a plurality of generally radially extending portions of material extending generally between the inner support portion 108 and the outer support portion 110. Therefore, the support portion may be considered to be provided with a plurality of generally axially extending apertures 116 (which apertures 116 may define the deformable connecting portion 112).

In cross-section the apertures 116 are generally of the form of a sector of an annulus. The apertures may alternatively be described as being trapezoids in cross section and may be described as being generally rectangular.

The thickness of the inner support portion 108 is generally sufficiently large that the apertures 116 in the deformable connecting portion 112 do not act as anti-resonance elements. For example the thickness of the inner support portion 108 may be at least 1 µm to 500 µm.

Although in this embodiment, the deformable connecting portion 112 comprises a single ring structure arranged around the inner support portion 108, in alternative embodiments the deformable connecting portion 112 may comprise a plurality of concentric ring structures arranged around the inner support portion 108 of the type described above and shown in FIGS. 7 and 8.

The optical fiber 100 may be referred to as a hollow-core, photonic crystal fiber (HC-PCF). Typically, such a hollow-core, photonic crystal fiber comprises a cladding portion (which may for example comprise anti-resonance elements) for guiding radiation within the fiber, and a support portion. The support portion is typically a relatively thick jacket or tube of material which supports the cladding portion. The optical fiber 100 according to an embodiment of the invention is advantageous over such known hollow-core, photonic crystal fibers because the deformable connecting portion 112 can act as a mechanical stress absorber to which any externally applied stress (for example applied to the outer support portion 110) can be predominantly dissipated without being transferred directly to the cladding portion (comprising the capillaries 104). In other words, the deformable connecting portion 112 isolates the inner support portion 108, the cladding portion (i.e. the capillaries 104) and the hollow core 102 from the outer support portion 110.

Without such a deformable connecting portion 112, any external stress applied to the support portion can be transferred directly to the cladding portion. However, in general, the optical performance of the cladding portion (which comprises anti-resonance elements in the form of capillaries 104) is sensitive to local stresses within the anti-resonance elements because such stress can cause variations in the refractive index profile or induce birefringence. These effects can be detrimental to the optical performance and can result in modal scrambling or in an increase of confinement loss. These effects typically depend on wavelength and are the stronger the shorter the wavelength.

In use, it may be that the optical fiber 100 is not supported along its entire length (for example on a surface). At least for some applications, the optical fiber 100 may be sufficiently long that such support is not practical. For this reason, typically photonic crystal fibers are often supported using a plurality of discrete, spaced-apart local mounts or clamps. For example, in use, the optical fiber 100 may be clamped at each end of the fiber (and one or more intermediate clamps may be provided therebetween). Mounting the optical fiber 100 in this way will introduce specific local external stress to the optical fiber 100. Similarly, any bending of the optical fiber 100 (which may be desired in a particular application) will also introduce specific local external stress to the fiber.

Advantageously, in contrast to known arrangements, the optical fiber 100 according to an embodiment of the invention at least partially addresses these problems since any externally applied stress or tension is reduced by the deformable connecting portion 112 before reaching the cladding portion (i.e. the capillaries 104). As a result, the detrimental effects on the optical performance associated with externally applied stress can be mitigated.

In an embodiment, the inner support portion 108, the outer support portion 110 and the deformable connecting portion 112 are all formed from the same material. In particular, in some embodiments this material comprises glass. That is, the material comprises an amorphous (i.e. non-crystalline) material that exhibits a glass transition when heated to a transition temperature. For example, the material may comprise a silica glass. For example, parts of the optical fiber 100 (for example the capillaries 104, the inner support portion 108, the outer support portion 110 and the deformable connecting portion 112) may comprise any of the following: high purity silica ($SiO_2$) (for example the F300 material as marketed by Heraeus Holding GmbH of Germany); soft glasses such as for example lead-silicate glass (for example the SF6 glass marketed by Schott AG of Germany); or other specialty glasses such as for example chalcogenide glass or heavy metal fluoride glasses (also referred to as ZBLAN glasses). Advantageously, glass materials do not outgas.

It is particularly advantageous for the inner support portion 108, the outer support portion 110 and the deformable connecting portion 112 to be formed from the same material, in particular a material such as glass which does not outgas, as now discussed.

In typical beam-delivery applications, it is known to provide optical fibers with a protective polymer coating which surrounds the glass material from which the fiber is formed. Such a protective coating can distribute the stress and can mitigate the detrimental effects that external stress can cause.

In alternative embodiments, one or more the components of the optical fiber 100 may be formed from polymer material. Components of the optical fiber 100 that may be formed from polymer material include: the inner support portion 108, the outer support portion 110, the deformable connecting portion 112 and/or the cladding portion (which comprises anti-resonance elements in the form of capillaries 104).

As discussed further below with reference to FIGS. 9 to 11, in use, the optical fiber 100 may form part of an apparatus for receiving input radiation and broadening a frequency range of the input radiation so as to provide output radiation. For example, it may be arranged to receive high intensity, ultra-fast laser pulses and the hollow core 102 may be filled with a suitable working gas that such ultra-fast laser pulses can interact with so as to produce a supercontinuum. To achieve this, the optical fiber 100 may be disposed in gas chamber 128 which is filled with the working gas 126 (see FIGS. 10 and 11). In such applications it is desirable to avoid any polymer coatings since these coatings can undergo outgassing within the closed environment of the gas chamber. These outgassed vapours can find their way into the hollow core 102 of the optical fiber 100 where they can interact with the laser radiation and can lead to contaminants being deposited therein. In turn, these can reduce the optical performance of the supercontinuum source.

It is therefore advantageous to form the outer support portion 110 and the deformable connecting portion 112 (which together may be considered to form an outer protective stress-mitigating mechanism) from the same material (for example glass) as the inner support portion 108, such that outgassing is avoided.

Figure 9:
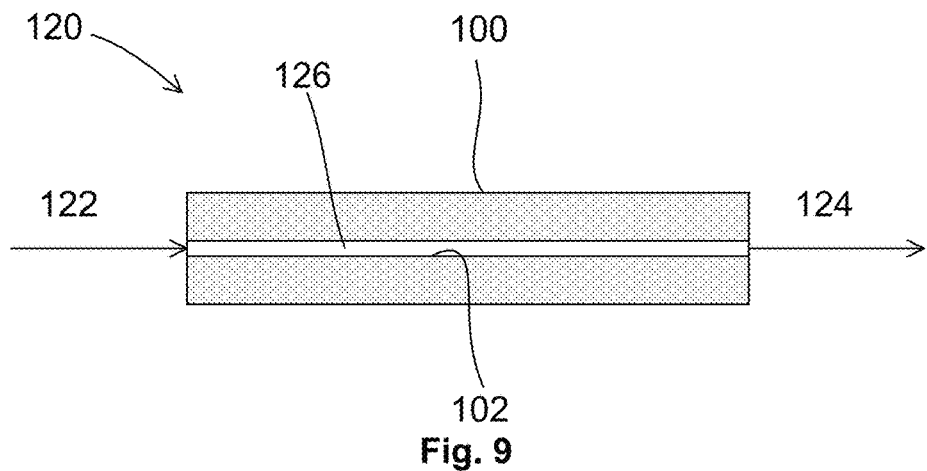
FIG. 9 depicts an apparatus for broadening the frequency range of received input radiation, the apparatus comprising the optical fiber shown in FIGS. 7 and 8.

FIG. 9 shows schematically a general set up for an apparatus 120 for receiving input radiation 122 and broadening a frequency range of the input radiation 122 so as to provide broadband output radiation 124. The apparatus 120 comprises the optical fiber 100 with a hollow core 102 for guiding radiation propagating through the optical fiber 100. It will be appreciated that in order to aid the clarity of the Figure only the hollow core 102 of the optical fiber 100 is shown in FIG. 9 (and the cladding and support portions are not distinguished). The apparatus 120 further comprises a gas 126 disposed within the hollow core 102, wherein the gas comprises a working component which enables the broadening of the frequency range of the received input radiation 126 so as to provide broadband output radiation 124.

The working component of the gas 126 may be a noble gas. The working component may comprise one or more of Argon, Krypton, Neon, Helium and Xenon. Alternatively or additionally to the noble gas, the working component may comprise a molecular gas (e.g. $N_2$, $O_2$, $CH_4$, $SF_6$).

In one implementation, the gas 126 may be disposed within the hollow core 102 at least during receipt of input radiation 122 for producing broadband output radiation 124. It will be appreciated that, while the apparatus 120 is not receiving input radiation 122 for producing broadband output radiation, the gas 126 may be wholly or partially absent from the hollow core 102. In general, the apparatus 120 comprises an apparatus for providing the gas 126 within the hollow core 102 of the optical fiber 100. Such apparatus for providing the gas 126 within the hollow core 102 of the optical fiber 100 may comprise a reservoir, as now discussed with reference to FIG. 10.

Figure 10:
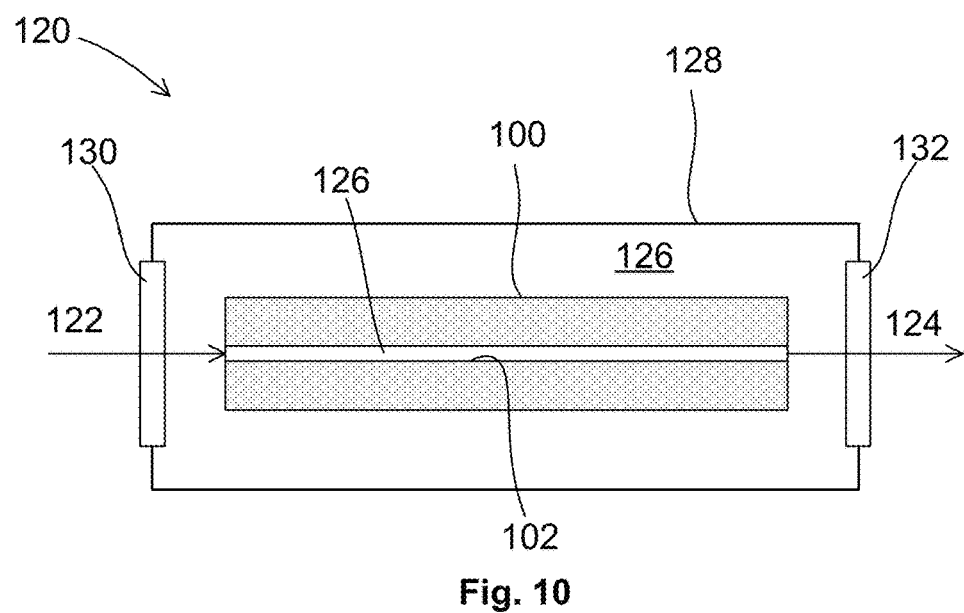
FIG. 10 depicts an apparatus for broadening the frequency range of received input radiation of the type shown in FIG. 9, further comprising a reservoir.

FIG. 10 shows the apparatus 120 as shown in FIG. 9 further comprising a reservoir 128. The optical fiber 100 is disposed inside the reservoir 128. The reservoir 128 may also be referred to as a housing or container. The reservoir 128 is configured to contain gas 126. The reservoir 128 may comprise one or more features, known in the art, for controlling, regulating, and/or monitoring the composition of the gas 126 inside the reservoir 128. The reservoir may comprise a first transparent window 130. In use, the optical fiber 100 is disposed inside the reservoir 128 such that the first transparent window 130 is located proximate to an input end of the optical fiber 100. The first transparent window 130 may form part of a wall of the reservoir 128. The first transparent window 130 may be transparent for at least the received input radiation frequencies, so that received input radiation 122 (or at least a large portion thereof) may be coupled into the optical fiber 100 located inside reservoir 128. The reservoir 128 may comprise a second transparent window 132, forming part of a wall of the reservoir 128. In use, when the optical fiber 100 is disposed inside the reservoir 128, the second transparent window 132 is located proximate to an output end of the optical fiber 100. The second transparent window 132 may be transparent for at least the frequencies of the broadband output radiation 124 of the apparatus 120.

Alternatively, in another embodiment, the two opposed ends of the optical fiber 100 may be placed inside different reservoirs. The optical fiber 100 may comprise a first end section configured to receive input radiation 122, and a second end section for outputting broadband output radiation 124. The first end section may be placed inside a first reservoir, comprising a gas 126. The second end section may be placed inside a second reservoir, wherein the second reservoir may also comprise a gas 126. The functioning of the reservoirs may be as described in relation to FIG. 10 above. The first reservoir may comprise a first transparent window, configured to be transparent for input radiation 122. The second reservoir may comprise a second transparent window configured to be transparent for broadband output broadband radiation 124. The first and second reservoirs may also comprise a sealable opening to permit the optical fiber 100 to be placed partially inside and partially outside the reservoir, so that the gas is sealed inside the reservoir. The optical fiber 100 may further comprise a middle section not contained inside a reservoir. Such an arrangement using two separate gas reservoirs may be particularly convenient for embodiments wherein the optical fiber 100 is relatively long (for example when the length is more than 1 m). It will be appreciated that for such arrangements which use two separate gas reservoirs, the two reservoirs (which may comprise one or more features, known in the art, for controlling, regulating, and/or monitoring the composition of the gas 126 inside the two reservoirs) may be considered to provide an apparatus for providing the gas 126 within the hollow core 102 of the optical fiber 100.

In this context a window may be transparent for a frequency if at least 50%, 75%, 85%, 90%, 95%, or 99% of incident radiation of that frequency on the window is transmitted through the window.

Both the first 130 and the second 132 transparent windows may form an airtight seal within the walls of the reservoir 128 so that the gas 126 may be contained within the reservoir 128. It will be appreciated that the gas 126 may be contained within the reservoir 128 at a pressure different to the ambient pressure of the reservoir 128.

In order to achieve frequency broadening high intensity radiation may be desirable. An advantage of having a hollow core optical fibre 100 is that it may achieve high intensity radiation through strong spatial confinement of radiation propagating through the optical fiber 100, achieving high localised radiation intensities. In addition, hollow core designs (for example as compared to solid core designs) can result in higher quality transmission modes (for example, having a greater proportion of single mode transmission). The radiation intensity inside the optical fiber 100 may be high, for example due to high received input radiation intensity and/or due to strong spatial confinement of the radiation inside the optical fiber 100.

An advantage of using a hollow core optical fiber 100 may be that the majority of the radiation guided inside the optical fiber 100 is confined to the hollow core 102. Therefore, the majority of the interaction of the radiation inside the optical fiber 100 is with the gas 126, which is provided inside the hollow core 102 of the optical fiber 100. As a result, the broadening effects of the working component of the gas 126 on the radiation may be increased.

The received input radiation 122 may be electromagnetic radiation. The input radiation 122 may be received as pulsed radiation. For example, the input radiation 122 may comprise ultrafast pulses. The mechanism for the spectral broadening as the radiation interacts with the gas 126 may be for example one or more of four-wave mixing, modulation instability, ionisation of the working gas, Raman effects, Kerr nonlinearity, soliton formation, or soliton fission. In particular, the spectral broadening may be achieved through one or both of soliton formation, or soliton fission.

The input radiation 122 may be coherent radiation. The input radiation 122 may be collimated radiation, and advantage of which may be to facilitate and improve the efficiency of coupling the input radiation 122 into the optical fiber 100. The input radiation 122 may comprise a single frequency, or a narrow range of frequencies. The input radiation 122 may be generated by a laser. Similarly, the output radiation 124 may be collimated and/or may be coherent.

The broadband range of the output radiation 124 may be a continuous range, comprising a continuous range of radiation frequencies. The output radiation 124 may comprise supercontinuum radiation. Continuous radiation may be beneficial for use in a number of applications, for example in metrology applications. For example, the continuous range of frequencies may be used to interrogate a large number of properties. The continuous range of frequencies may for example be used to determine and/or eliminate a frequency dependency of a measured property. Supercontinuum output radiation 124 may comprise for example electromagnetic radiation over a wavelength range of 100 nm-4000 nm. The broadband output radiation 124 frequency range may be for example 400 nm-900 nm, 500 nm-900 nm, or 200 nm-2000 nm. The supercontinuum output radiation 124 may comprise white light.

Figure 11:
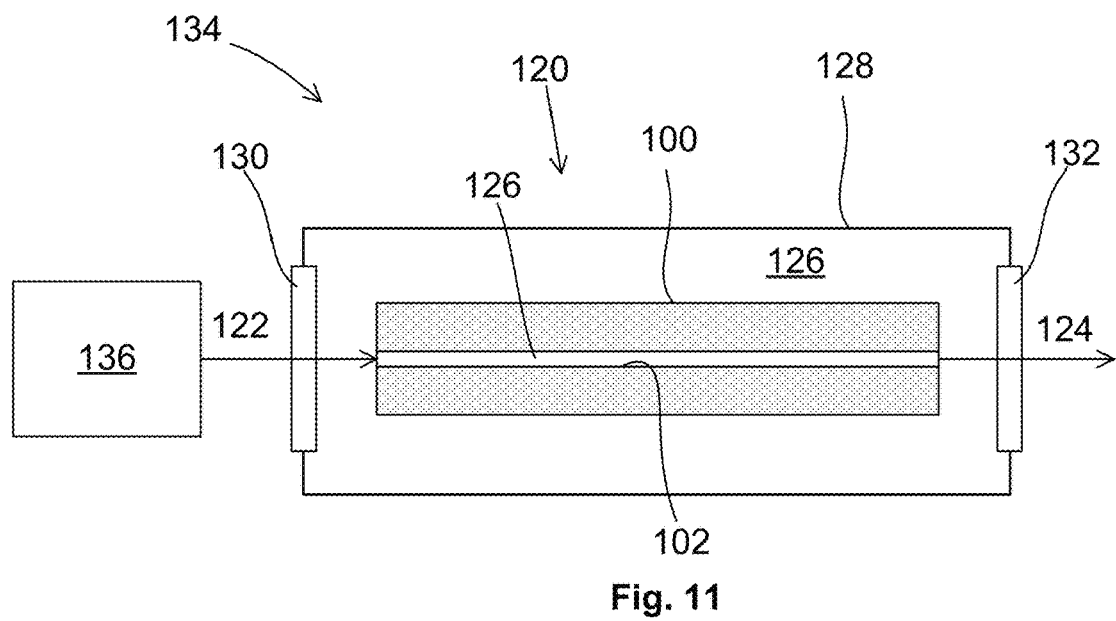
FIG. 11 depicts a schematic representation of a radiation source for providing broadband output radiation, the radiation source comprising the apparatus for broadening the frequency range of received input radiation as shown in FIG. 10.

FIG. 11 depicts a radiation source 134 for providing broadband output radiation. The radiation source 134 comprises an apparatus 120 as described above with reference to FIG. 10. The radiation source 34 further comprises an input radiation source 136 configured to provide input radiation 122 to the apparatus 120. The apparatus 120 may receive input radiation 122 from the input radiation source 136, and broaden it to provide output radiation 124.

The input radiation 122 provided by the input radiation source 136 may be pulsed. The input radiation 122 may comprise electromagnetic radiation of one or more frequencies between 200 nm and 2 µm. The input radiation 122 may for example comprise electromagnetic radiation with a wavelength of 1.03 µm. The repetition rate of the pulsed radiation 122 may be of an order of magnitude of 1 kHz to 100 MHz. The pulse energies may have an order of magnitude of 0.1 µJ to 100 µJ, for example 1-10 µJ. A pulse duration for the input radiation 122 may be between 10 fs and 10 ps, for example 300 fs. The average power of input radiation 122 may be between 100 mW to several 100 W. The average power of input radiation 122 may for example be 20-50 W.

The broadband output radiation 124 provided by the radiation source 134 may have an average output power of at least 1 W. The average output power may be at least 5 W. The average output power may be at least 10 W. The broadband output radiation 124 may be pulsed broadband output radiation 124. The broadband output radiation 124 may have a power spectral density in the entire wavelength band of the output radiation of at least 0.01 mW/nm. The power spectral density in the entire wavelength band of the broadband output radiation may be at least 3 mW/nm.

The radiation source 134 described above may be provided as part of a metrology arrangement for determining a parameter of interest of a structure on a substrate. The structure on the substrate may for example be a lithographic pattern applied to the substrate. The metrology arrangement may further comprise an illumination sub-system for illuminating the structure on the substrate. The metrology arrangement may further comprise a detection sub-system for detecting a portion of radiation scattered and/or reflected by the structure. The detection sub-system may further determine the parameter of interest on the structure from the portion of radiation scattered and/or reflected by the structure. The parameter may for example be overlay, alignment, or levelling data of the structure on the substrate.

As explained above, some embodiments of the present invention relate to a new design of optical fiber 100 which is a hollow-core, photonic crystal fiber of a type comprising anti-resonant structures for confinement of radiation. Such a new design of optical fiber 100 is described above with reference to FIGS. 7 and 8. Some other embodiments of the present invention relate to a new design of optical fiber which is a hollow-core fiber of the type known as a capillary waveguide.

Such embodiments may be substantially the same as the optical fiber 100 is described above with reference to FIGS. 7 and 8 but having no tubular capillaries (i.e. having all of the six tubular capillaries 104 show in FIG. 7 removed).

Such an optical fiber comprises: a hollow core (equivalent to the hollow core 102 shown in FIG. 7); and a cladding portion surrounding the hollow core. The cladding portion comprises an inner support (equivalent to the inner support portion 108 shown in FIG. 7) without microstructures (i.e. having all of the six tubular capillaries 104 show in FIG. 7 removed). It will be appreciated that a cladding portion that comprises an inner support without microstructures is not intended to encompass hollow core photonic crystal fibers (either anti-resonance fibers or photonic band gap fibers).

The cladding portion further comprises an outer portion (equivalent to the outer support portion 110 shown in FIG. 7) and a deformable connecting portion (equivalent to the deformable connecting portion 112 shown in FIG. 7) connecting the inner portion to the outer portion.

Such capillary waveguides (typically with larger cores than photonic crystal fibers) are used, for example, in high-energy physics. Capillary waveguides may, for example, have cores of the order of some 100 µm to some mm. These capillary waveguides are very sensitive to stress. The optical fiber according to such embodiments of the invention (of the form of a capillary waveguide) is advantageous for reasons analogous to those explained above with reference to the optical fiber 100 shown in FIGS. 7 and 8. In particular, the deformable connecting portion can act as a mechanical stress absorber to which any externally applied stress (for example applied to the outer portion) can be dissipated without being transferred directly to the inner support. In other words, the deformable connecting portion isolates the inner support from the outer portion.

Other than having no capillaries, the optical fiber according to such embodiments of the invention (of the form of a capillary waveguide) may have any features of the optical fiber 100 described above with reference to FIGS. 7 and 8.

The hollow core of such a capillary waveguide may have a diameter larger than 20 µm. Optionally, the hollow core may have a diameter larger than 50 µm. Optionally, the hollow core may have a diameter larger than 100 µm.

Methods of manufacture of hollow core optical fibers are now discussed with reference to FIGS. 12, 13 and 14.

A method for forming hollow core optical fibers in fiber drawing facilitates using a technique that may be referred to as a stack-and-draw method is now described with reference to FIG. 12.

First, a preform 140 is formed (see FIG. 12A). This typically is achieved by stacking capillaries and/or rods 142 into a surrounding capillary 144 which is known as the preform jacket 144. In the example shown in FIG. 12A, six capillaries 142 are stacked within a single preform jacket 144. However, it will be appreciated that different numbers and configurations of capillaries or rods may alternatively be used. The capillaries and/or rods 142 typically have outer dimensions of a few mm and the resulting preform 140 typically has an outer diameter of some cm. A cross-section of the preform 140 coarsely mimics the cross-section of the desired optical fiber 152 (see FIG. 12C).

Second, the preform 140 undergoes a heating and drawing process to form a cane 146. This involves feeding one end of the preform 140 into a furnace at a feed speed. This end of the preform 140 is pulled or drawn out of the furnace at a drawing speed which is different from the feed speed and, as a result, the preform 140 becomes tapered. The preform 140 which is fed into the furnace is transformed into the cane 146, which is longer (in an axial direction, i.e. perpendicular to the plane of FIG. 12) and thinner (in a transverse plane, i.e. in the plane of FIG. 12). The preform 140 which had a transverse diameter of the order of a few cm is transformed into a cane 146, typically having an outer diameter of some mm. As can be seen from the schematic representations in FIGS. 12A and 12B, an internal structure of the object is slightly changed as the preform 140 is transformed into the cane 146 but nonetheless the transverse cross-section of the cane 146 still coarsely mimics the cross-section of the desired optical fiber 152.

The cane 146 may be sleeved by a capillary 148 known as a cane jacket 148. The cane 146 and the cane jacket 148 may be referred to as a manufacturing intermediate 150.

Next, the manufacturing intermediate 150 undergoes a heating and drawing process to form an optical fiber 152 (see FIG. 12C). The optical fiber 152 comprises a cladding portion (comprising six hollow tubes or capillaries 154) surrounding a hollow core; and an outer support portion 156 (comprising a tube). It will be appreciated that the provision of the (optional) cane jacket 148 results in an enlarged final outer diameter of the optical fiber 152. In particular, it results in a thicker support portion 156 (which is formed from an outer portion of the cane and the cane jacket 148, which are fused together during the heating and drawing process).

The heating and drawing process used to transform the manufacturing intermediate 150 into the optical fiber 152 is similar to that described above. In addition to the application of heat (using a furnace), as the manufacturing intermediate 150 is fed into the furnace and the optical fiber 152 is drawn out of the furnace, pressure may be controlled so as to expand or collapse the hollow-channels within the object and achieve desired dimensions of the capillaries 154 in the final optical fiber 152. For example different pressures may be maintained in different parts of the manufacturing intermediate 150 to promote expansion, collapse or stability of the dimensions of different parts of the manufacturing intermediate 150, as is known in the art.

It may be desirable to form optical fibers 152 with relatively thin capillary walls (for example, having a wall thickness of 200 nm of less). The inventors have found that when drawing fibers 152 with capillary 154 walls which are this thin, properties of the capillaries 154 of the optical fiber 152 have a strongly increased sensitivity to variations in the process parameters of the heating and drawing processes described above. This can result, for example, in an uncontrolled expansion of the capillaries 154 and can lead to a final optical fiber 152 wherein adjacent tubes of capillaries 154 are in contact (which may be undesirable).

In addition to forming optical fibers 152 with relatively thin capillary walls (for example, having a wall thickness of 200 nm of less) in the cladding portion, it is also desirable to form optical fibers 152 with a relatively thick outer diameter so as to reduce sensitivity of the optical performance of the optical fiber 152 to external stresses (for example, applied by mechanical or thermal effects). However, the inventors have found that the fabrication yield of optical fibers 152 with such relatively thin walls reduces dramatically as the outer diameter of the fiber 152 increases. It is thought that during the drawing process (when the manufacturing intermediate 150 is transformed into the optical fiber 152), the support portion acts as to conduct heat to the cladding portion and, as a result, the capillaries of the cladding portion start tapering at an earlier position in the furnace than the support portion.

New methods for forming hollow core optical fibers according to embodiments of the present invention and which may at least partially address the above problems are now described with reference to FIGS. 13 and 14. The new methods for forming hollow core optical fibers in fiber drawing facilitates also use a technique that may be referred to as a stack-and-draw method and which are similar to the method described above with reference to FIG. 12. However, the new methods schematically shown in FIGS. 13 and 14 involve the provision of a modified manufacturing intermediate (from which the optical fiber is produced by heating and drawing). The modified manufacturing intermediates 158, 176 differ from the manufacturing intermediate 150 shown in FIG. 12 in that they each comprise a structured protection layer which surrounds the area of thin-walled glass elements from which the cladding portion of the final optical fiber 164, 178 is formed. As discussed below, advantageously this reduces the sensitivity of the hollow core optical fiber to process parameter variations and, in addition, results in an increased structural fidelity and yield of the optical fiber.

Figure 13C:
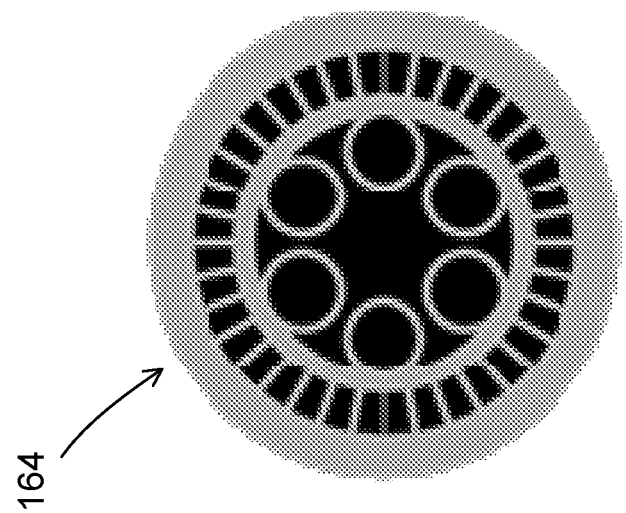
FIGS. 13(A)-13(C) are a schematic cross sectional view of: 13(A) a preform; 13(B) a manufacturing intermediate (comprising a cane and cane jacket); and 13(C) an optical fiber formed during a first new method for forming hollow core optical fibers in fiber drawing facilitates using a technique that may be referred to as a stack-and-draw method.
Figure 13B:
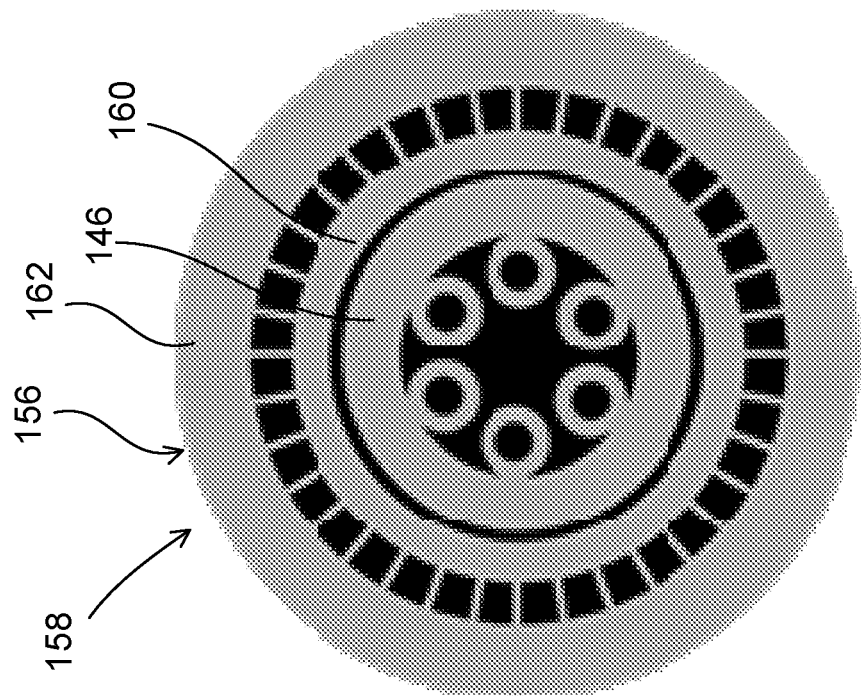

As schematically shown in FIGS. 13 and 14, the new methods of forming an optical fiber 164, 178 both comprise: providing a modified manufacturing intermediate (comprising at least one ring structure comprising a plurality of apertures arranged generally between an inner support portion and an outer support portion); and heating and drawing the modified manufacturing intermediate so as to form the optical fiber.

The first new method is now described with reference to FIG. 13.

Figure 13A:
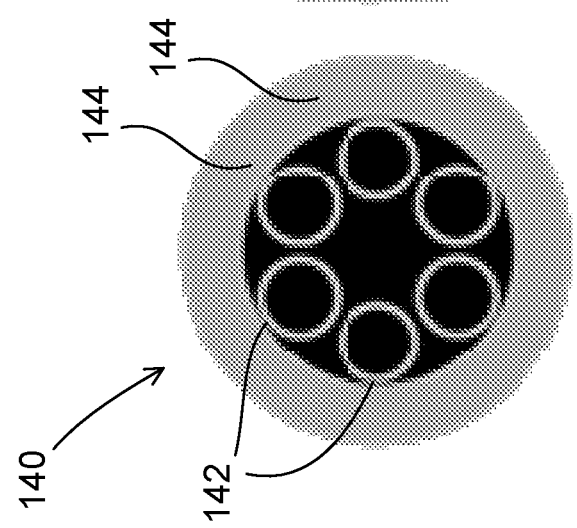

First, a preform 140 is formed (see FIG. 13A). The preform 140 is of the same form as the preform 140 shown in FIG. 12 and may be formed in the same way (as described above). Second, the preform 140 undergoes a heating and drawing process to form a cane 146. The cane 146 is of the same form as the cane 146 shown in FIG. 12 and may be formed in the same way (as described above).

The cane 146 is sleeved by an outer jacket 156 so as to form a modified manufacturing intermediate 158. Therefore, at least part of the modified manufacturing intermediate 158 (the cane 146) is formed by heating and drawing the preform 140. The modified manufacturing intermediate 158 further comprises the outer jacket 156.

The modified manufacturing intermediate 158 comprises: a cladding portion (formed by portions of the cane 146 which correspond to the six capillaries 142 of the preform 140) that surrounds a hollow core; and a support portion surrounding the cladding portion. The support portion comprises a portion of the cane 146 which corresponds to the preform jacket 144 of the preform 140 and the outer jacket 156. The outer jacket 156 comprises an inner portion 160, an outer portion 162 and a connecting portion connecting the inner portion 160 to the outer portion 162. The connecting portion comprises a ring structure arranged around the inner portion 160 the ring structure comprising a plurality of apertures arranged generally between the inner portion 160 and the outer portion 162.

The support portion of the modified manufacturing intermediate 158 comprises an inner support portion, an outer support portion and a connecting portion connecting the inner support portion to the outer support portion. The inner support portion of the modified manufacturing intermediate 158 comprises a portion of the cane 146 which corresponds to the preform jacket 144 of the preform 140 and the inner portion 160 of the outer jacket 156. The outer portion of the modified manufacturing intermediate 158 comprises the outer portion 162 of the outer jacket 156. The connecting portion of the modified manufacturing intermediate 158 comprises the connecting portion of the outer jacket 156.

Next, the modified manufacturing intermediate 158 undergoes a heating and drawing process to form an optical fiber 164 (see FIG. 13C). The optical fiber 164 is generally of the form of the optical fiber 100 shown in FIGS. 7 and 8 and as described above. The heating and drawing process used to transform the modified manufacturing intermediate 158 into the optical fiber 164 is similar to that described above with reference to FIG. 12.

The second new method is now described with reference to FIG. 14.

First, a modified preform 166 is formed (see FIG. 14A). In a similar way to the formation of the preform 140 shown in FIG. 12A and described above, the modified preform 166 is formed by stacking capillaries and/or rods 142 into a modified preform jacket 168. The modified preform jacket 168 comprises an inner portion 170, an outer portion 172 and a connecting portion connecting the inner portion 170 to the outer portion 172. The connecting portion comprises a ring structure arranged around the inner portion 170 the ring structure comprising a plurality of apertures arranged generally between the inner portion 170 and the outer portion 172.

In the example shown in FIG. 12A, six capillaries 142 are stacked within the modified preform jacket 168. However, it will be appreciated that different numbers and configurations of capillaries or rods may alternatively be used. The capillaries and/or rods 142 typically have outer dimensions of a few mm and the resulting modified preform 166 typically has an outer diameter of some cm. A cross-section of the modified preform 166 coarsely mimics the cross-section of the desired optical fiber 178 (see FIG. 14C).

Second, the modified preform 166 undergoes a heating and drawing process to form a modified cane 174. The modified cane 174 may be formed from the modified preform 166 in the same way (as described above) as the cane 146 shown in FIG. 12 is formed from preform 140.

The modified cane 174 is sleeved by a cane jacket 148 (of the same form as the cane jacket 148 shown in FIG. 12) so as to form a modified manufacturing intermediate 176. The cane jacket 148 may be referred to as an outer jacket 148.

Therefore, at least part of the modified manufacturing intermediate 176 (the modified cane 174) is formed by heating and drawing the modified preform 166. The modified manufacturing intermediate 176 further comprises the cane jacket 148.

The modified manufacturing intermediate 176 comprises: a cladding portion (formed by portions of the modified cane 174 which correspond to the six capillaries 142 of the modified preform 166) that surrounds a hollow core; and a support portion surrounding the cladding portion. The support portion comprises a portion of the modified cane 174 which corresponds to the modified preform jacket 168 and the cane jacket 148.

The support portion of the modified manufacturing intermediate 176 comprises an inner support portion, an outer support portion and a connecting portion connecting the inner support portion to the outer support portion. The inner support portion of the modified manufacturing intermediate 176 comprises a portion of the modified cane 174 which corresponds to the inner portion 170 of the modified preform jacket 168. The outer portion of the modified manufacturing intermediate 176 comprises: a portion of the modified cane 174 which corresponds to outer portion 172 of the modified preform jacket 168; and the cane jacket 148. The connecting portion of the modified manufacturing intermediate 158 comprises a portion of the modified cane 174 which corresponds to the connecting portion of the the modified preform jacket 168.

Next, the modified manufacturing intermediate 174 undergoes a heating and drawing process to form an optical fiber 178 (see FIG. 14C). The optical fiber 178 is generally of the form of the optical fiber 100 shown in FIGS. 7 and 8 and as described above. The heating and drawing process used to transform the modified manufacturing intermediate 174 into the optical fiber 178 is similar to that described above with reference to FIG. 12.

The two new methods described above with reference to FIGS. 13 and 14 allow a hollow core optical fiber 164, 178 to be formed. The optical fiber 164, 178 may be a hollow-core, photonic crystal fiber (HC-PCF). The optical fiber 164, 178 may be an optical fiber 100 of the form discussed above and shown in FIGS. 7 and 8.

The two new methods described above with reference to FIGS. 13 and 14 are advantageous since the modified manufacturing intermediates 158, 176 are provided with a connecting portion comprising a ring structure arranged around the inner support portion before the modified manufacturing intermediates are heated and drawn so as to form the optical fibers 164, 178. This connecting portion can act as a thermally insulating layer during the heating and drawing process. Advantageously, this can protect the cladding portion during the fiber drawing process.

The cladding portion surrounding the hollow core may comprise a plurality of tubes disposed in a ring structure around the hollow core. Following the heating and drawing of the modified manufacturing intermediates 158, 176 so as to form the optical fibers 164, 178, these tubes (which may alternatively be referred to as capillaries) may each form an anti-resonance element for guiding radiation through the hollow core. It may be desirable for the plurality of tubes or capillaries to be arranged so that following the heating and drawing of the manufacturing intermediates 158, 176 so as to form the optical fibers 164, 178 each of the tubes is not in contact with any of the other tubes.

The optical fibers 164, 178 may be suitable for use in an apparatus for receiving input radiation and broadening a frequency range of the input radiation so as to provide output radiation (for example of the form of the apparatus 120 shown in FIGS. 9 and 10). In some embodiments, it may be desirable for (following the heating and drawing of the manufacturing intermediate 158, 176 so as to form the optical fiber 164, 178) the tubes or capillaries of the cladding portion of the optical fiber 164, 178 to have a wall thickness of 200 nm of less. This may enable resonance-free operation (within an apparatus of the form of the apparatus 120 shown in FIGS. 9 and 10) for wavelengths down to 400 nm. The inventors have found that when drawing fibers with capillary walls which are this thin using the process described above with reference to FIG. 12, properties of the capillaries of the optical fiber have a strongly increased sensitivity to variations in the process parameters of the heating and drawing process. This can result, for example, in an uncontrolled expansion of the capillaries and can lead to a final optical fiber wherein adjacent tubes of capillaries are in contact.

In addition to forming optical fibers with relatively thin capillary walls (for example, having a wall thickness of 200 nm of less) in the cladding portion, it is also desirable to form optical fibers with a relatively thick outer diameter so as to reduce sensitivity of the optical performance of the optical fiber to external stresses (for example, applied by mechanical or thermal effects). However, the inventors have found that, when using the process described above with reference to FIG. 12, the fabrication yield of optical fibers with such relatively thin walls reduces dramatically as the outer diameter of the fiber increases. It is thought that during the drawing process, the support portion acts as to conduct heat to the cladding portion and, as a result, the capillaries of the cladding portion start tapering at an earlier position than the support portion.

The connecting portion of the modified manufacturing intermediates 158, 176 provided as part of the methods described above with reference to FIGS. 13 and 14 can act as a thermally insulating layer during the heating and drawing processes of these methods. Advantageously, this can protect the cladding portion during the fiber drawing process.

It will be appreciated that as used herein a manufacturing intermediate is an intermediate form obtained during the process of producing the optical fiber. The manufacturing intermediate may be formed from a preform of a fiber, and may be drawn into a fiber. The manufacturing intermediate may be comprise a cane and may also comprise a cane jacket.

The method described above with reference to FIG. 14 uses a manufacturing intermediate 176 with a connecting portion (comprising a ring structure arranged around the inner support portion) which was formed in the modified preform 166. This has the advantage that the thickness of (for example glass) material between cladding portion and the connecting portion in the optical fiber can be made very small.

The methods described above with reference to FIGS. 13 and 14 each use a manufacturing intermediate 158, 176 comprise a structured protection layer which surrounds the area of thin-walled glass elements from which the cladding portion of the final optical fiber 164, 178 is formed. In particular, they each comprise a ring structure surrounding an inner support portion. It will be appreciated that in alternative embodiments more than one such ring structure may be provided.

Further embodiments are provided in the subsequent numbered clauses:

1. An optical fiber comprising:
   a hollow core;
   a cladding portion surrounding the hollow core, the cladding portion comprising a plurality of anti-resonance elements for guiding radiation through the hollow core; and
   a support portion surrounding and supporting the cladding portion;
   wherein the support portion comprises an inner support portion, an outer support portion and a deformable connecting portion connecting the inner support portion to the outer support portion.
2. The optical fiber of clause 1 wherein the inner support portion, the outer support portion and the deformable connecting portion are formed from the same material.
3. The optical fiber of clause 1 or clause 2 wherein the material comprises glass.
4. The optical fiber of any preceding clause wherein the deformable connecting portion comprises a ring structure arranged around the inner support portion, the ring structure comprising a plurality of apertures interspersed with a plurality of generally radially extending portions of material extending generally between the inner support portion and the outer support portion.
5. The optical fiber of clause 4 wherein the deformable connecting portion comprises a plurality of ring structures arranged around the inner support portion, each ring structure comprising a plurality of apertures interspersed with a plurality of generally radially extending portions of material extending generally between the inner support portion and the outer support portion.
6. The optical fiber of clause 4 or clause 5 wherein in cross-section the apertures are generally rectangular.

7. The optical fiber of clause 4 or clause 5 wherein in cross-section the apertures are generally of the form of a sector of an annulus.

8. The optical fiber of any one of clauses 4 to 7 wherein the thickness of the inner support portion is sufficiently large that the apertures in the deformable connecting portion do not act as anti-resonance elements.

9. The optical fiber of any preceding clause wherein the plurality of anti-resonance elements of the cladding portion are disposed in a ring structure around the hollow core.

10. The optical fiber of any preceding clause wherein each of the plurality of anti-resonance elements comprises a capillary.

11. The optical fiber of any preceding clause wherein the plurality of anti-resonance elements is arranged so that each of the anti-resonance elements is not in contact with any of the other anti-resonance elements.

12. An apparatus for receiving input radiation and broadening a frequency range of the input radiation so as to provide broadband output radiation, the apparatus comprising:

the optical fiber of any preceding clause; and a gas disposed within the hollow core for broadening a frequency range of a received input radiation so as to provide the broadband output radiation.

13. The apparatus of clause 12 wherein the broadband output radiation comprises a continuous range of radiation frequencies.

14. The apparatus of clause 12 or clause 13 wherein the gas comprises a noble gas.

15. A radiation source for providing broadband output radiation, the radiation source comprising:

the apparatus according to any of clauses 12 to 14; and an input radiation source configured to provide input radiation to the apparatus;

wherein the apparatus is configured to broaden the input radiation to provide the broadband output radiation.

16. The radiation source of clause 15, wherein the broadband output radiation has an average power of at least 1 W.

17. A metrology arrangement for determining a parameter of interest of a structure on a substrate, the metrology arrangement comprising:

the radiation source of clause 15 or clause 16;

an illumination sub-system for illuminating the structure on the substrate using the broadband output radiation; and a detection sub-system for detecting a portion of radiation scattered and/or reflected by the structure, and for determining the parameter of interest from said portion of radiation.

18. A metrology apparatus comprising the metrology arrangement according to clause 17.

19. An inspection apparatus comprising the metrology arrangement according to clause 17.

20. A lithographic apparatus comprising the metrology arrangement according to clause 17.

21. An apparatus for delivering light from a light source to a sensor comprising the optical fiber of any one of clauses 1 to 11.

22. An optical fiber comprising:
a hollow core;
a cladding portion surrounding the hollow core, wherein the cladding portion comprises an inner support without microstructures, an outer portion and a deformable connecting portion connecting the inner portion to the outer portion.

23. The optical fiber of clause 22 wherein the hollow core has a diameter larger than 20 µm.

24. A method of forming an optical fiber, the method comprising:

providing a manufacturing intermediate having an elongate body comprising: a hollow core; a cladding portion surrounding the hollow core; and a support portion surrounding the cladding portion, wherein the support portion comprises an inner support portion, an outer support portion and a connecting portion connecting the inner support portion to the outer support portion, the connecting portion comprising a ring structure arranged around the inner support portion, the ring structure comprising a plurality of apertures arranged generally between the inner support portion and the outer support portion; and heating and drawing the manufacturing intermediate so as to form the optical fiber.

25. The method of clause 24 wherein providing the manufacturing intermediate comprises:

providing a preform; and
heating and drawing the preform so as to form at least part of the manufacturing intermediate.

26. The method of clause 25 wherein providing the manufacturing intermediate further comprises providing the at least part of the manufacturing intermediate within an outer jacket.

27. The method of clause 26 wherein the connecting portion comprising a ring structure arranged around the inner support portion is formed in the outer jacket.

28. The method of clause 26 or clause 27 wherein the connecting portion comprising a ring structure arranged around the inner support portion is formed in the preform.

The metrology arrangement described above may form part of a metrology apparatus MT. The metrology arrangement described above may form part of an inspection apparatus. The metrology arrangement described above may be included inside a lithographic apparatus LA.

Although specific reference may be made in this text to the use of lithographic apparatus in the manufacture of ICs, it should be understood that the lithographic apparatus described herein may have other applications. Possible other applications include the manufacture of integrated optical systems, guidance and detection patterns for magnetic domain memories, flat-panel displays, liquid-crystal displays (LCDs), thin-film magnetic heads, etc.

Although specific reference may be made in this text to embodiments of the invention in the context of a lithographic apparatus, embodiments of the invention may be used in other apparatus. Embodiments of the invention may form part of a mask inspection apparatus, a metrology apparatus, or any apparatus that measures or processes an object such as a wafer (or other substrate) or mask (or other patterning device). These apparatus may be generally referred to as lithographic tools. Such a lithographic tool may use vacuum conditions or ambient (non-vacuum) conditions.

Although specific reference may have been made above to the use of embodiments of the invention in the context of optical lithography, it will be appreciated that the invention, where the context allows, is not limited to optical lithography and may be used in other applications, for example imprint lithography.

Although specific reference is made to "metrology apparatus/tool/system" or "inspection apparatus/tool/system", these terms may refer to the same or similar types of tools, apparatuses or systems. E.g. the inspection or metrology apparatus that comprises an embodiment of the invention may be used to determine characteristics of structures on a substrate or on a wafer. E.g. the inspection apparatus or metrology apparatus that comprises an embodiment of the invention may be used to detect defects of a substrate or defects of structures on a substrate or on a wafer. In such an embodiment, a characteristic of interest of the structure on the substrate may relate to defects in the structure, the absence of a specific part of the structure, or the presence of an unwanted structure on the substrate or on the wafer.

While specific embodiments of the invention have been described above, it will be appreciated that the invention may be practiced otherwise than as described. The descriptions above are intended to be illustrative, not limiting. Thus it will be apparent to one skilled in the art that modifications may be made to the invention as described without departing from the scope of the claims set out below.

The invention claimed is:

1. An apparatus for receiving input radiation and broadening a frequency range of the input radiation so as to provide broadband output radiation, the apparatus comprising:
   an optical fiber comprising:
      a hollow core;
      a cladding portion surrounding the hollow core, the cladding portion comprising a plurality of anti-resonance elements for guiding radiation through the hollow core; and
      a support portion surrounding and supporting the cladding portion, wherein the support portion comprises an inner support portion, an outer support portion, and a deformable connecting portion connecting the inner support portion to the outer support portion; and
   a gas disposed within the hollow core configured to broaden a frequency range of a received input radiation so as to provide the broadband output radiation, wherein:
      the broadband output radiation comprises a continuous range of radiation frequencies, or
      the gas comprises a noble gas, and
   wherein the deformable connecting portion is configured to deform thereby reducing stress in the optical fiber.

2. The apparatus of claim 1, wherein the inner support portion, the outer support portion, and the deformable connecting portion are formed from the same material.

3. The apparatus of claim 2, wherein the material comprises glass.

4. The apparatus of claim 1, wherein the deformable connecting portion comprises a ring structure arranged around the inner support portion, the ring structure comprising a plurality of apertures interspersed with a plurality of generally radially extending portions of material extending generally between the inner support portion and the outer support portion.

5. The apparatus of claim 4, wherein the deformable connecting portion comprises a plurality of ring structures arranged around the inner support portion, each ring structure comprising a plurality of apertures interspersed with a plurality of generally radially extending portions of material extending generally between the inner support portion and the outer support portion.

6. The apparatus of claim 4, wherein in cross-section the apertures are generally rectangular.

7. The apparatus of claim 4, wherein in cross-section the apertures are generally of the form of a sector of an annulus.

8. The apparatus of claim 4, wherein the thickness of the inner support portion is sufficiently large that the apertures in the deformable connecting portion do not act as anti-resonance elements.

9. The apparatus of claim 1, wherein at least one of:
   the plurality of anti-resonance elements of the cladding portion are disposed in a ring structure around the hollow core,
   each of the plurality of anti-resonance elements comprises a capillary, and
   the plurality of anti-resonance elements is arranged so that each of the anti-resonance elements is not in contact with any of the other anti-resonance elements.

10. A radiation source for providing broadband output radiation, the radiation source comprising:
    an apparatus configured to receive input radiation and broadening a frequency range of the input radiation so as to provide broadband output radiation, the apparatus comprising:
       an optical fiber comprising:
          a hollow core;
          a cladding portion surrounding the hollow core, the cladding portion comprising a plurality of anti-resonance elements for guiding radiation through the hollow core; and
          a support portion surrounding and supporting the cladding portion, wherein the support portion comprises an inner support portion, an outer support portion, and a deformable connecting portion connecting the inner support portion to the outer support portion;
       a gas disposed within the hollow core configured to broaden a frequency range of a received input radiation so as to provide the broadband output radiation, wherein:
          the broadband output radiation comprises a continuous range of radiation frequencies, or
          the gas comprises a noble gas; and
    an input radiation source configured to provide input radiation to the apparatus,
    wherein the apparatus is configured to broaden the input radiation to provide the broadband output radiation, and
    wherein the deformable connecting portion is configured to deform thereby reducing stress in the optical fiber.

11. A metrology arrangement for determining a parameter of interest of a structure on a substrate, the metrology arrangement comprising:
    the radiation source of claim 10;
    an illumination sub-system for illuminating the structure on the substrate using the broadband output radiation; and
    a detection sub-system for detecting a portion of radiation scattered and/or reflected by the structure, and for determining the parameter of interest from said portion of radiation.

12. A lithographic apparatus comprising:
    a metrology arrangement configured to determine a parameter of interest of a structure on a substrate, the metrology arrangement comprising:
       the radiation source of claim 10;
       an illumination sub-system configured to illuminate the structure on the substrate using the broadband output radiation; and a detection sub-system for detecting a portion of radiation scattered and/or reflected by the structure, and for determining the parameter of interest from said portion of radiation.

13. An optical fiber comprising:
a hollow core; and
a cladding portion surrounding the hollow core, wherein the cladding portion comprises an inner support without microstructures, an outer portion, and a deformable connecting portion connecting the inner portion to the outer portion,
wherein the hollow core comprises no microstructures and extends to an inner surface of the cladding portion.

14. The optical fiber of claim 13, wherein the microstructures are anti-resonance elements for guiding radiation through the hollow core.

15. A method of forming an optical fiber, the method comprising:
providing a manufacturing intermediate having an elongate body comprising:
a hollow core;
a cladding portion surrounding the hollow core; and
a support portion surrounding the cladding portion, wherein the support portion comprises an inner support portion, an outer support portion, and a deformable connecting portion connecting the inner support portion to the outer support portion, the deformable connecting portion comprising a ring structure arranged around the inner support portion, the ring structure comprising a plurality of apertures arranged generally between the inner support portion and the outer support portion; and
heating and drawing the manufacturing intermediate so as to form the optical fiber,
wherein the deformable connecting portion is configured to deform thereby reducing stress in the optical fiber.

* * * * *